United States Patent
Nanami

(10) Patent No.: US 8,214,125 B2
(45) Date of Patent: Jul. 3, 2012

(54) APPARATUS FOR CHANGING A VEHICLE SPEED SETTING OF CRUISE CONTROL

(75) Inventor: Takeshi Nanami, Gotenba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 437 days.

(21) Appl. No.: 12/310,370

(22) PCT Filed: Nov. 14, 2007

(86) PCT No.: PCT/IB2007/004295
§ 371 (c)(1),
(2), (4) Date: Feb. 23, 2009

(87) PCT Pub. No.: WO2008/059384
PCT Pub. Date: May 22, 2008

(65) Prior Publication Data
US 2009/0240398 A1     Sep. 24, 2009

(30) Foreign Application Priority Data

Nov. 14, 2006 (JP) .................................. 2006-308361

(51) Int. Cl.
*B06T 8/32* (2006.01)
(52) U.S. Cl. .............. 701/93; 701/65; 701/74; 180/179; 180/197; 180/446; 475/276; 475/281; 475/278; 475/275
(58) Field of Classification Search ............. 701/93, 701/96, 65, 72, 74, 78; 180/179, 197, 446; 477/118, 144; 475/276, 281
See application file for complete search history.

(56) References Cited

U.S. PATENT DOCUMENTS

| 6,732,039 B2 | 5/2004 | Ino et al. |
| 7,113,859 B2 * | 9/2006 | Hellmann et al. .............. 701/93 |
| 2003/0105574 A1 | 6/2003 | Ino et al. |
| 2005/0114009 A1 | 5/2005 | Hellmann et al. |
| 2005/0131614 A1 | 6/2005 | Isogai et al. |

FOREIGN PATENT DOCUMENTS

| DE | 103 47 844 A1 | 5/2005 |
| JP | A-8-67171 | 3/1996 |
| JP | A-08-175222 | 7/1996 |
| JP | A-2004-114988 | 4/2004 |
| JP | A-2005-29128 | 2/2005 |
| JP | A-2006-123587 | 5/2006 |
| WO | WO 03/074344 A1 | 9/2003 |

OTHER PUBLICATIONS

Office Action issued in Chinese Patent Application No. 200780031838.5 dated Jun. 9, 2011.

* cited by examiner

*Primary Examiner* — Thomas G. Black
*Assistant Examiner* — Luke Huynh
(74) *Attorney, Agent, or Firm* — Oliff & Berridge, PLC

(57) ABSTRACT

A vehicle speed setting of cruise control is changed based on an operation by a driver. At this time, it is determined whether the vehicle is traveling in a passing lane or a traveling lane (S202). If the vehicle is traveling in a passing lane, the speed at which the vehicle speed setting is changed is increased (S206). If a blinker on the passing lane side of the vehicle is on (S205), the speed at which the vehicle speed setting is changed is also increased (S206) even if the vehicle is traveling in the traveling lane.

21 Claims, 20 Drawing Sheets

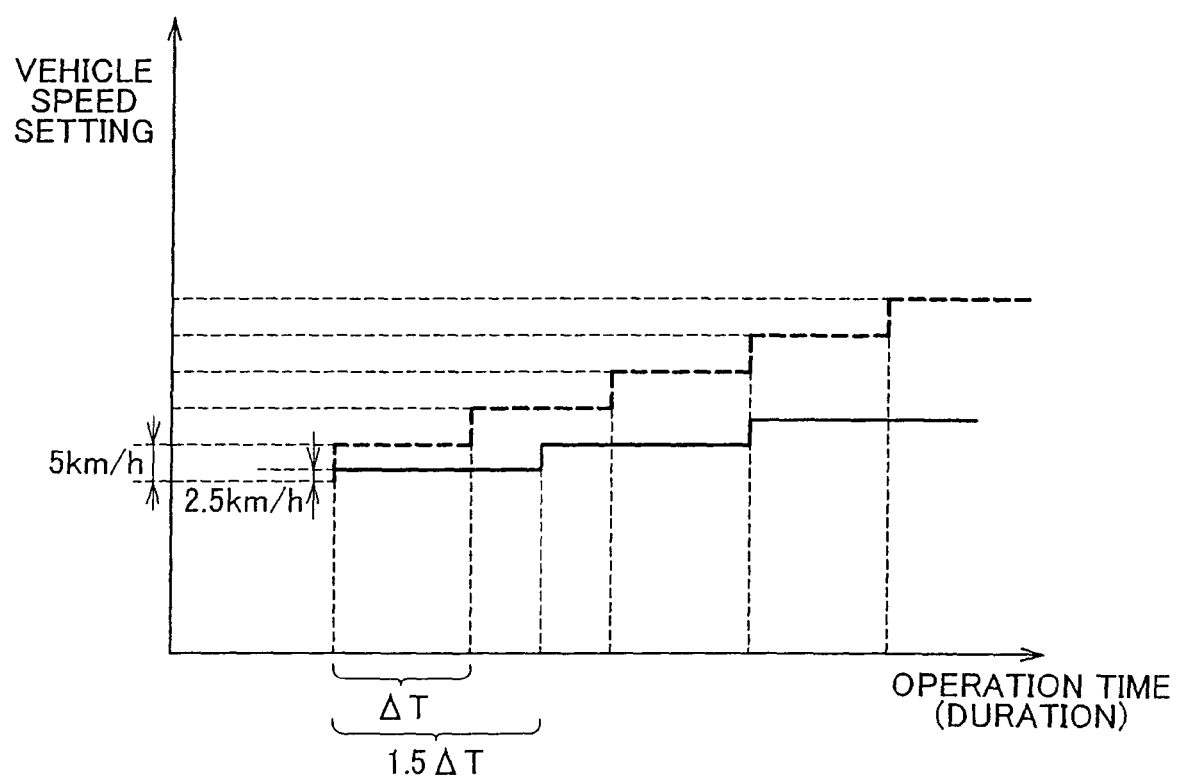

APPARATUS FOR CHANGING A VEHICLE SPEED SETTING OF CRUISE CONTROL

BACKGROUND OF THE INVENTION

1. Field of the Invention

The invention relates to an apparatus for changing a vehicle speed setting of cruise control.

2. Description of the Related Art

Cruise control controls a vehicle so that it travels at a constant speed that was selected and set by the driver. Japanese Patent Application Publication No. 2004-114988 (JP-A-2004-114988) describes one such constant speed running control apparatus. This apparatus changes the vehicle speed setting in predetermined amounts according to an operation of a lever by the driver. Operating the lever for a longer period of time increases the predetermined amount that the vehicle speed can be changed. For example, the vehicle speed setting increases (or decreases) by 1 km/h every time the lever is operated up (or down) once. When the lever is held up (or down) for an extended period of time, the vehicle speed setting increases (or decreases) by of 5 km/h.

In the foregoing related art, the vehicle speed starts to change only when the driver performs an operation that is reflected in the operating time of the lever. Therefore, despite the fact that the vehicle speed setting needs to change quicker when the vehicle is traveling in a passing lane of an expressway than it does when the vehicle is traveling in a traveling lane, the speed at which the vehicle speed setting changes (hereinafter referred to as the "change speed of the vehicle speed setting") in response to a lever operation is the same regardless of which lane the vehicle is traveling in, and therefore does not meet the expectations of the driver. Also, if the vehicle speed setting is changed while the driver is looking off (i.e., not paying attention), for example, it would be undesirable for the change speed of the vehicle speed setting to increase in the same manner that it would while the driver is paying attention to the road. That is, despite the fact that the demand related to the change speed of the vehicle speed setting changes depending on the running environment such as the road type and the state of the driver, with the related art, the change speed of the vehicle speed setting in response to a lever operation is always the same regardless of the running environment, and thus is not always suited to the running environment.

SUMMARY OF THE INVENTION

This invention thus provides an apparatus for changing the vehicle speed setting of cruise control, which can change the vehicle speed setting at a change speed suited to the running environment.

One aspect of the invention relates to an apparatus of a cruise control system provided in a vehicle, which changes a vehicle speed setting of cruise control based on an operation by a driver. The apparatus includes a change time setting portion that changes the speed at which the vehicle speed setting is changed (hereinafter this speed will simply be referred to as the "change speed") according to a running environment of the vehicle, and a change instructing portion that outputs a command to change the vehicle speed setting at the change speed that was set by the change time setting portion.

In this apparatus, the change speed of the vehicle speed setting can be changed according to the running environment of the vehicle so a vehicle speed setting that is appropriate for the running environment is possible.

The running environment may be the type of road on which the vehicle is traveling. Accordingly, a vehicle speed setting that is appropriate for the type of road, such as an expressway, an ordinary road, a passing lane, a traveling lane, or the like is made possible by increasing the change speed of the vehicle speed setting when the vehicle is traveling on a road in which there is a need to quickly change speed compared to when the vehicle is traveling on a road in which there is no need to quickly change speed. As a result, the expectations of the driver can be met.

The road type may include a straight road and a curved road. The vehicle speed setting may be quickly decreased if it is high while the vehicle is traveling on a curved road. Accordingly, increasing the change speed of the vehicle speed setting when the vehicle is traveling on a curved road as compared to when the vehicle is traveling on a straight road helps achieve more appropriate cornering and also enables the expectations of the driver to be met.

The cruise control system may be an adaptive cruise control system, and the running environment may be the presence or absence of a leading vehicle according to the adaptive cruise control system. When a leading vehicle that the vehicle is following with adaptive cruise control accelerates and the vehicle speed setting is lower than the speed of the leading vehicle, the vehicle may be left behind. Therefore, changing the change speed of the vehicle speed setting according to whether there is a leading vehicle prevents the vehicle from being left behind the leading vehicle and also enables the expectations of the driver to be met.

The running environment may be a speed of the vehicle. For example, when there are sections of road with no speed limit, such as the Autobahn, interspersed with sections of road where there is a predetermined speed limit (such as 100 km/h), the vehicle speed setting may be made to change all at once between the predetermined speed limit and the speed at which it is desired that the vehicle travel where there is no speed limit. Accordingly, changing the change speed of the vehicle speed setting according to the speed of the vehicle enables a vehicle speed setting suitable for this kind of running environment to be set, as well as enables the expectations of the driver to be met.

The running environment may be a state of a driver (hereinafter also referred to as the "driver state"). In this case, the change speed of the vehicle speed setting is reduced when the driver is changing the vehicle speed setting while looking off compared to the change speed of the vehicle speed setting when the driver is changing the vehicle speed setting while facing forward so safety can be improved.

In the apparatus according to the foregoing aspect, the operation by the driver may include a first operation and a second operation, and the duration of the second operation may be longer than the duration of the first operation. Furthermore, the vehicle speed setting may be changed by a first predetermined change amount every time the first operation is performed, and the vehicle speed setting may be changed by a second predetermined change amount which is greater than the first predetermined change amount every time the second operation is performed. Also, the change time setting portion may change a change speed of the vehicle speed setting by increasing or decreasing the first predetermined change amount and the second predetermined change amount according to the running environment.

Also, the second operation may be determined based on whether the operation by the driver is continued for a predetermined period of time, and the change time setting portion may change the change speed of the vehicle speed setting by increasing or decreasing the predetermined period of time according to the running environment.

A cruise control system provided with the apparatus according to the foregoing aspect may also include an image sensor for obtaining an image of an area around the vehicle, a navigation system, and a cruise control lever that is operated by the driver to change the vehicle speed setting. The apparatus may also include a lane detecting portion that determines the which lane the vehicle is traveling in based on information obtained from the image sensor and the navigation system, and a lever operation detecting portion that detects an operation of the cruise control lever as well as the direction of that operation. The change time setting portion may increase the change speed when it has been determined that the vehicle is traveling in a passing lane of an expressway and the direction of the operation of the cruise control lever is a direction that increases the vehicle speed setting.

The cruise control system provided with the apparatus according to the foregoing aspect may also include a turn indicator. The apparatus may also include a blinker detecting portion that detects the direction indicated by the turn indicator. The change time setting portion may increase the change speed when it has been determined that the vehicle is traveling in a traveling lane of an expressway, the direction indicated is to a passing lane side, and the direction of the operation of the cruise control lever is the direction that increases the vehicle speed setting.

A cruise control system provided with the apparatus according to the foregoing aspect may also include an image sensor for obtaining an image of an area around the vehicle, a yaw rate sensor, a steering angle sensor, a navigation system, and a cruise control lever that is operated by the driver to change the vehicle speed setting. The apparatus may also include an optimum speed calculating portion, a speed difference setting portion, and a lever operation detecting portion. The optimum speed calculating portion detects whether a road on which the vehicle is traveling is a curved road from information obtained from the image sensor and the navigation system, calculates a curvature of the road on which the vehicle is currently traveling and the curvature along a route that the vehicle is expected to travel based on information from the yaw rate sensor and the steering angle sensor in addition to the image sensor and the navigation system, and calculates a first optimum speed for the curvature of the road on which the vehicle is currently traveling and a second optimum speed for the curvature along the route that the vehicle is expected to travel. The speed difference setting portion calculates a first speed difference, which is a difference between the current vehicle speed setting and the first optimum speed, and a second speed difference, which is a difference between the current vehicle speed setting and the second optimum speed. The lever operation detecting portion detects an operation of the cruise control lever as well as the direction of that operation. Furthermore, the change time setting portion may increase the change speed according to the greater difference, from among the first speed difference and the second speed difference, when at least one of the first speed difference and the second speed difference is a positive value and the direction of the operation of the cruise control lever is a direction that increases the vehicle speed setting.

A cruise control system provided with the apparatus according to the foregoing aspect may also include an image sensor for obtaining an image of an area around the vehicle, a millimeter wave sensor that detects an object by sending out millimeter waves, and a cruise control lever that is operated by the driver to change the vehicle speed setting. The apparatus may also include a leading vehicle determining portion that determines whether there is a leading vehicle based on information obtained from the millimeter wave sensor and the image sensor, and a lever operation detecting portion that detects an operation of the cruise control lever as well as the direction of that operation. Furthermore, the change time setting portion may increase the change speed when it is determined that there is a leading vehicle and the direction of the operation of the cruise control lever is a direction that increases the vehicle speed setting.

A cruise control system provided with the apparatus according to the foregoing aspect may also include a vehicle speed sensor that detects a vehicle speed, and a cruise control lever that is operated by the driver to change the vehicle speed setting. The apparatus may also include a vehicle speed detecting portion that detects the vehicle speed based on information obtained from the vehicle speed sensor, and a comparing portion that compares the vehicle speed with a predetermined value. Furthermore, the change time setting portion may calculate a difference between the vehicle speed and the predetermined value when the vehicle speed is greater than the predetermined value, and increases the change speed as the difference increases.

A cruise control system provided with the apparatus according to the foregoing aspect may also include a facing direction sensor that detects where the driver is facing, and a cruise control lever that is operated by the driver to change the vehicle speed setting. The apparatus may also include a driver state detecting portion that detects the direction that the driver is facing based on information from the facing direction sensor, and a facing direction determining portion that determines whether the driver is facing forward based on information from the driver state detecting portion. Furthermore, the change time setting portion may decrease the change speed when the driver is not facing forward and the direction of the operation of the cruise control lever is a direction that increases the vehicle speed setting.

The invention is thus able to provide an apparatus for changing a vehicle speed setting of cruise control at a change speed that is more suitable for the running environment.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 20 is a graph showing a specific example of the method for changing the vehicle speed setting during a long operation of the cruise control lever;

DETAILED DESCRIPTION OF THE EMBODIMENTS

Figure 1:
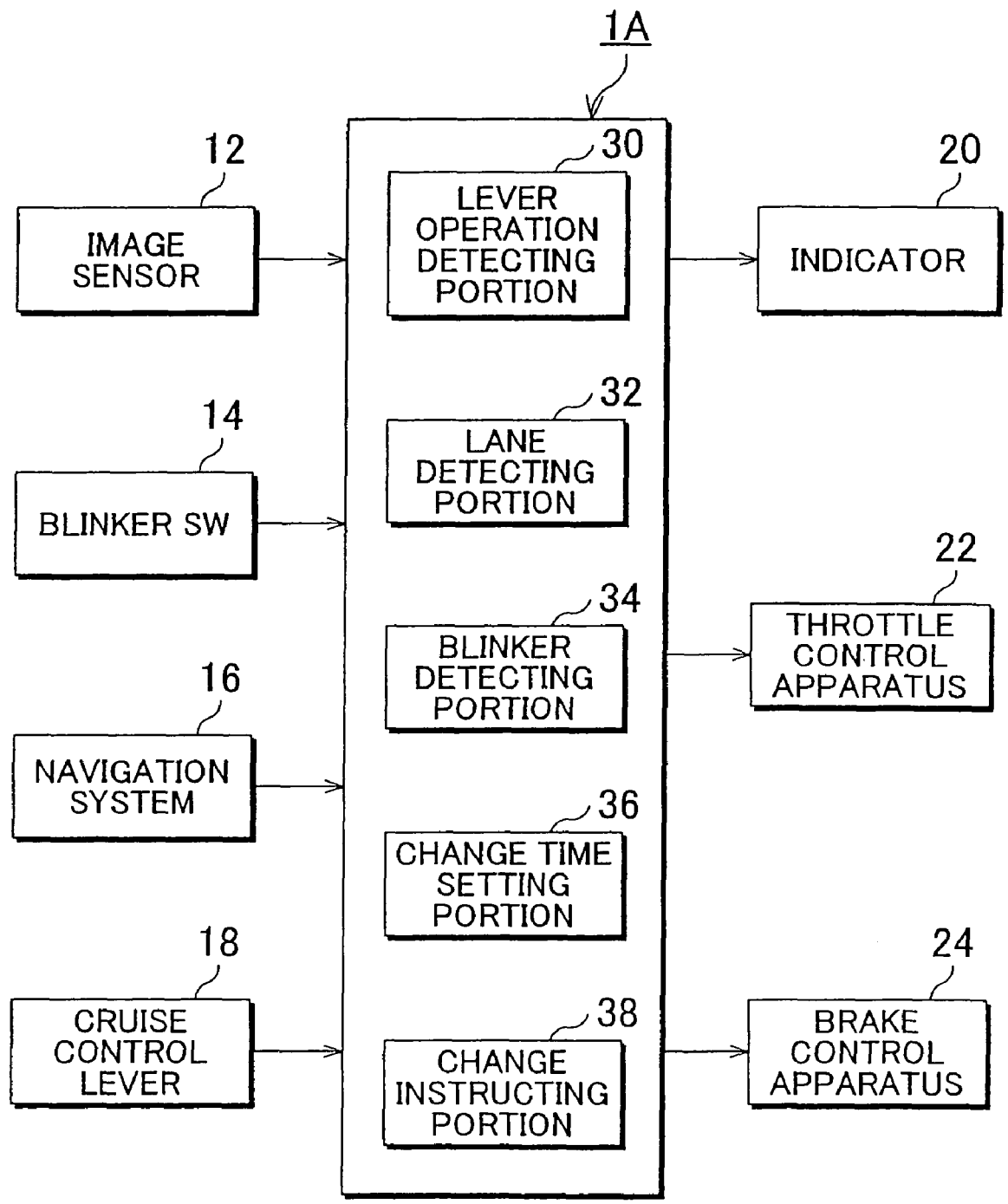
FIG. 1 is a block diagram of an apparatus for changing the vehicle speed setting according to a first example embodiment of the invention.

Hereinafter, example embodiments of the invention will be described in detail with reference to the accompanying drawings. In the following description, like parts will be denoted by like reference numerals and redundant descriptions will be omitted.

FIG. 1 is a block diagram of an apparatus for changing the vehicle speed setting according to a first example embodiment of the invention. This apparatus 1A changes the vehicle speed setting of cruise control in response to an operation by a driver, and is formed using the hardware of a microcomputer, such as an ECU (Electronic Control Unit), and software. As shown in FIG. 1, the input side of this apparatus 1A is connected to an image sensor 12, a blinker switch (SW) 14, a navigation system 16, and a cruise control lever 18.

The image sensor 12 is used, together with the navigation system 16 which guides the vehicle, to detect the lane in which the vehicle is traveling. The cruise control lever 18 is a lever that is operated up or down by the driver to change the vehicle speed setting of the cruise control. For example, during normal running, the vehicle speed setting increases or decreases by 1 km/h each time the lever 18 is operated up or down once. Also, when the lever 18 is held up or held down for an extended period of time, the vehicle speed setting increases or decreases by 5 km/h.

Also, the output side of this apparatus 1A is connected to an indicator 20, a throttle control apparatus 22, and a brake control apparatus 24. The indicator 20 indicates the current vehicle speed setting of the cruise control that is set by the driver. The throttle control apparatus 22 and the brake control apparatus 24 control the speed of the vehicle by controlling the throttle opening amount and the brake pressure, respectively.

As shown in FIG. 1, the apparatus 1A includes a lever operation detecting portion 30, a lane detecting portion 32, a blinker detecting portion 34, a portion 36 that sets the change time of the vehicle speed setting (hereinafter simply referred to as "change time setting portion"), and a portion 38 that outputs a command to change the vehicle speed setting (hereinafter referred to as a "change instructing portion").

The lever operation detecting portion 30 detects an operation of the cruise control lever 18 by the driver. The lane detecting portion 32 detects whether the vehicle is traveling in the passing lane or the traveling lane based on information from the image sensor 12 and the navigation system 16. The blinker detecting portion 34 detects whether the blinker switch 14 is on or off, and when the blinker switch 14 is on, whether it is the left blinker or the right blinker. The change time setting portion 36 changes the change speed of the vehicle speed setting according to the running environment of the vehicle, i.e., the road type, or more specifically, whether the vehicle is traveling in the passing lane or in the traveling lane. The method for changing the change speed will be described in detail later.

The change instructing portion 38 outputs a command to change the vehicle speed setting at the change speed that was set by the change time setting portion 36 in response to an operation of the cruise control lever 18 by the driver. In this way, the speed of the vehicle is controlled by a signal that is based on the vehicle speed setting of cruise control that was set being output to the throttle control apparatus 22 and the brake control apparatus 24.

Figure 2:
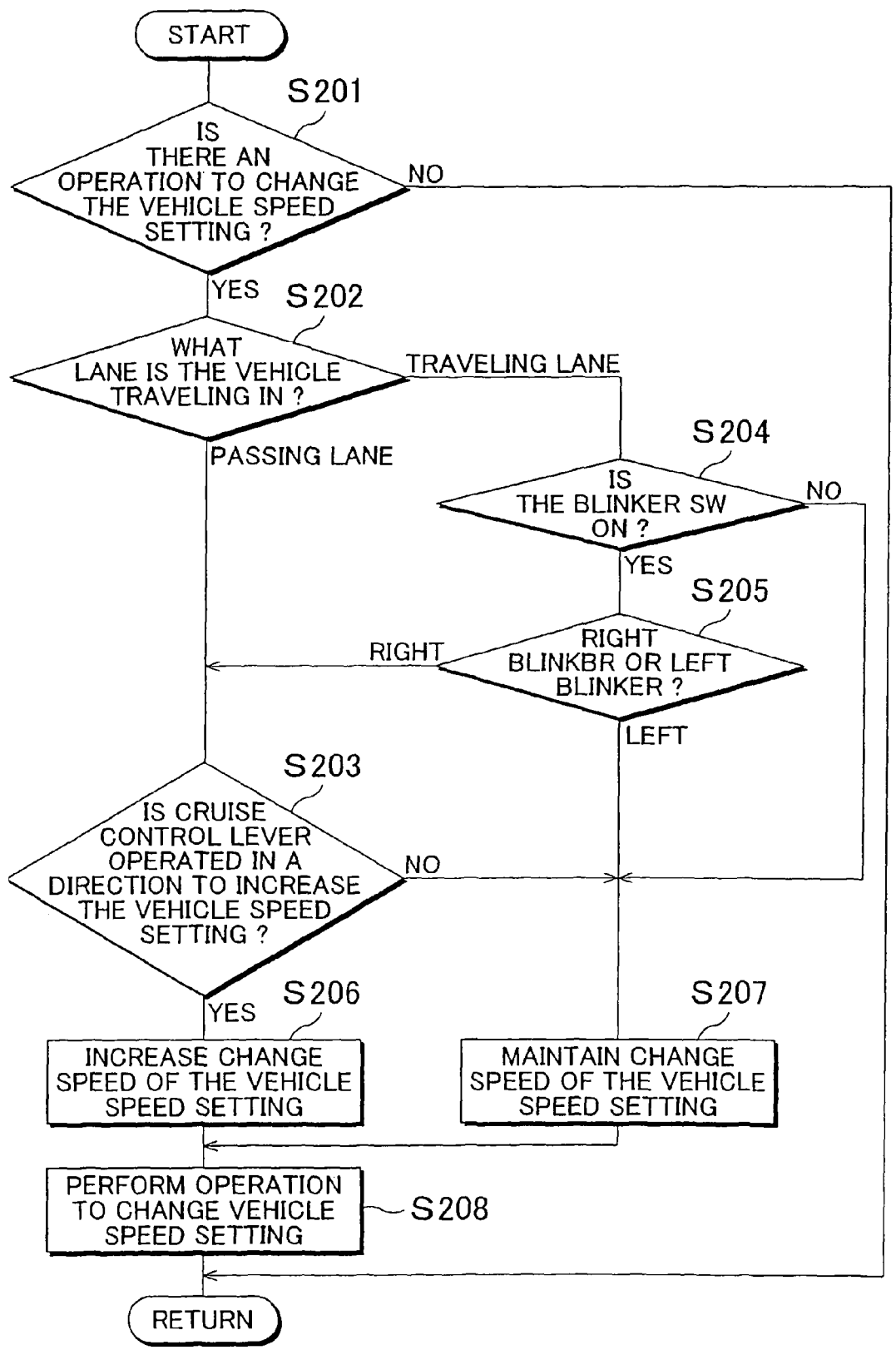
FIG. 2 is a flowchart illustrating a method for changing the vehicle speed setting in the first example embodiment.

Next, the method for changing the vehicle speed setting according to the apparatus 1A for changing the vehicle speed setting described above will be described with reference to the flowchart shown in FIG. 2.

First, the lever operation detecting portion 30 detects whether there is an operation to change the vehicle speed setting by detecting whether the driver is operating the cruise control lever 18 (step S201). If the cruise control lever 18 is being operated, the process proceeds on to step S202. If, on the other hand, the cruise control lever 18 is not being operated, this cycle of the routine ends.

In step S202, the lane detecting portion 32 detects whether the vehicle is currently traveling in the passing lane or the traveling lane based on information from the image sensor 12 and the navigation system 16. If the vehicle is traveling in the passing lane, the process proceeds on to step S203. If, on the other hand, the vehicle is traveling in the traveling lane, the process proceeds on to step S204.

In step S204, the blinker detecting portion 34 detects whether the blinker switch 14 is on or off. If the blinker switch 14 is on, the process proceeds on to step S205. If, on the other hand, the blinker switch 14 is off, the step proceeds on step S207.

In step S205, the blinker detecting portion 34 detects which of the blinkers, i.e., the left blinker or the right blinker, is on. If the blinker on the passing lane side (for example, the right blinker) is on, then the process proceeds on to step S203. If, on the other hand, the blinker on the other side, i.e., the side opposite the passing lane side, (for example, the left blinker) is on, the process proceeds on to step S207.

In step S203, the lever operation detecting portion 30 detects whether the cruise control lever 18 is being operated in a direction that increases the vehicle speed setting. If so, the process proceeds on to step S206. If not, i.e., if the lever 18 is being operated in a direction that reduces the vehicle speed setting, the process proceeds on to step S207.

Figure 3:
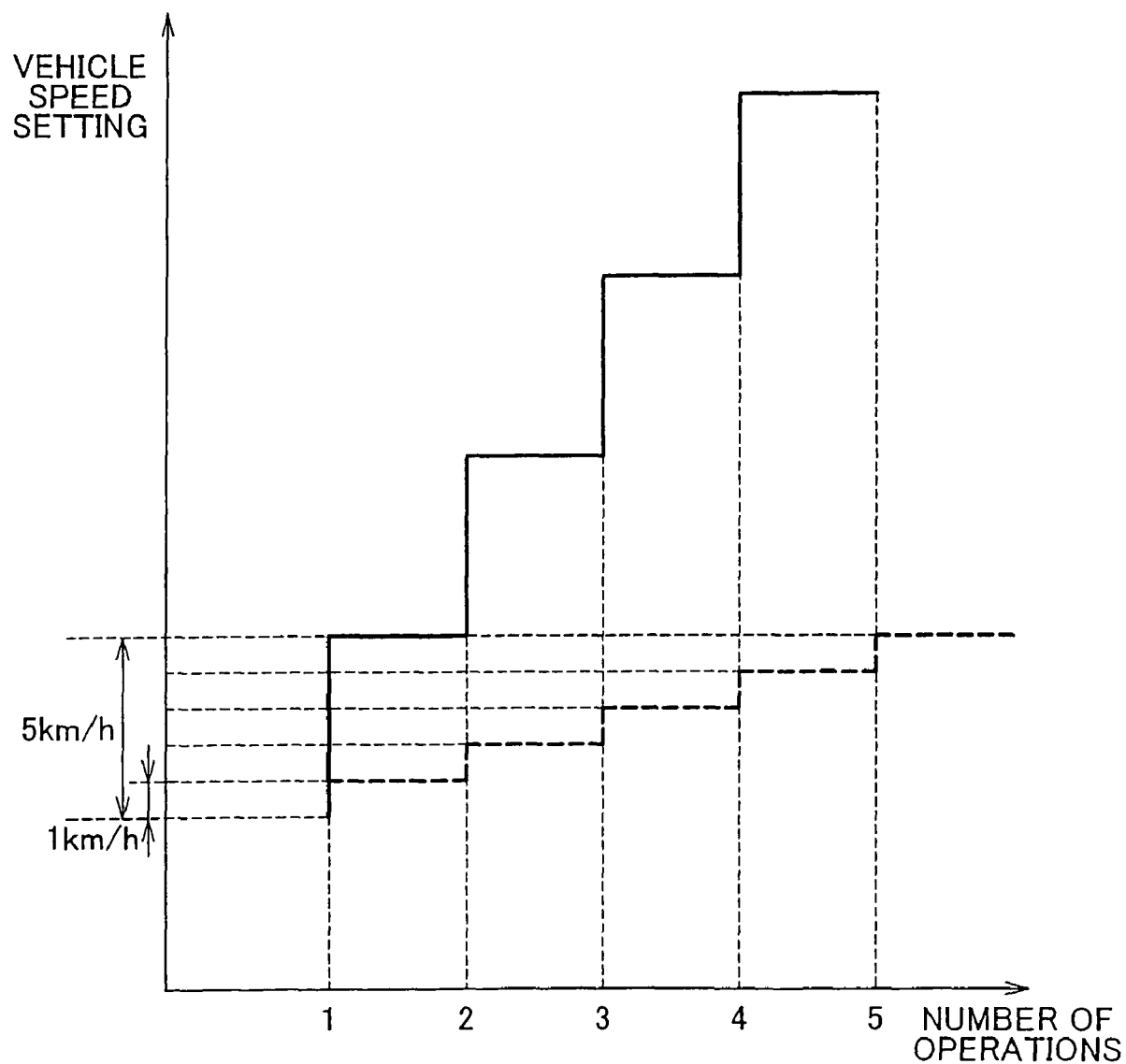
FIG. 3 is a graph showing a specific example of the method for changing the vehicle speed setting during a short operation of a cruise control lever.
Figure 4:
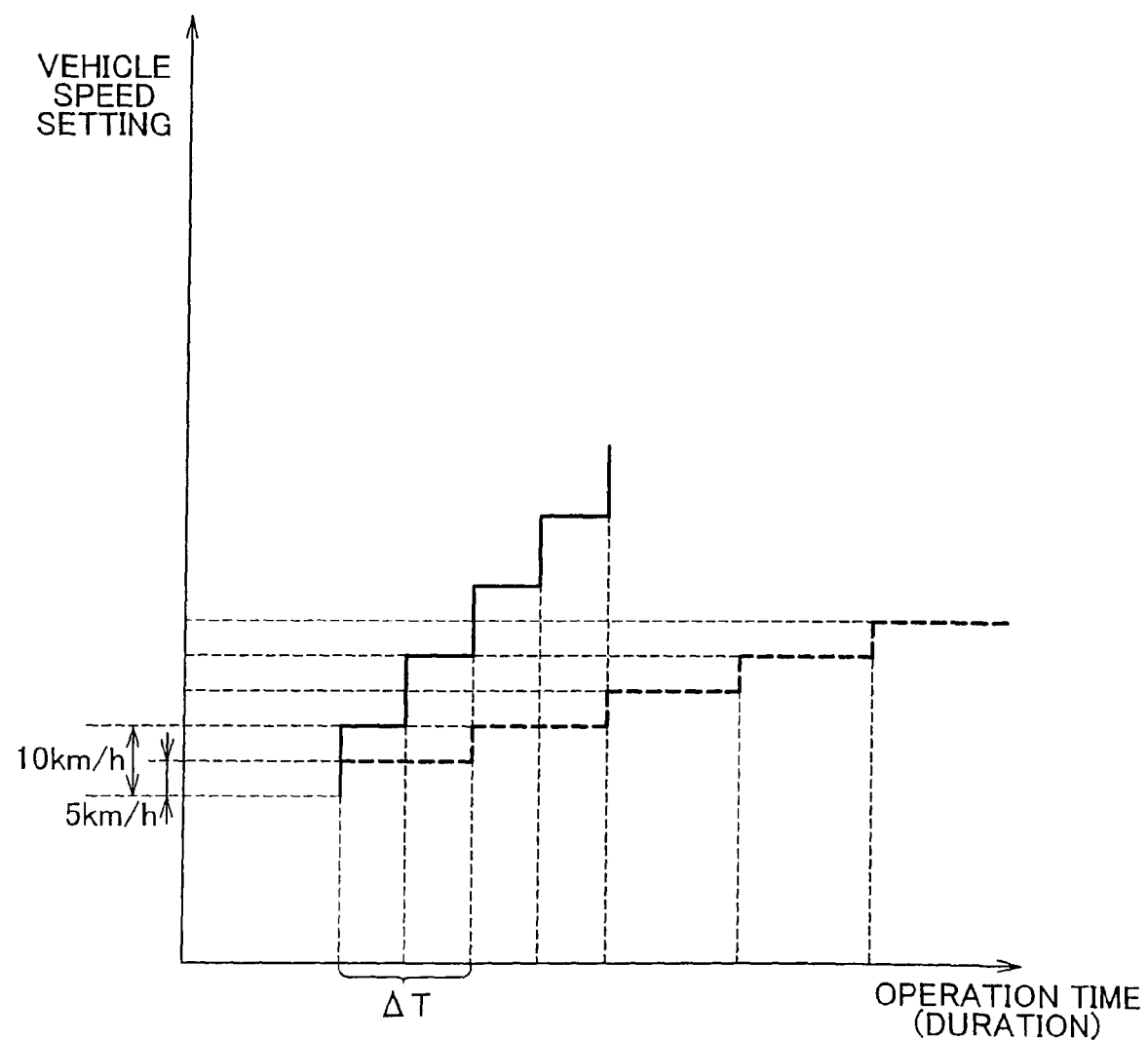
FIG. 4 is a graph showing a specific example of the method for changing the vehicle speed setting during a long operation of the cruise control lever.

In step S206, the change time setting portion 36 sets the change speed faster, i.e., so that it takes less time to change the vehicle speed setting. More specifically, as shown in FIG. 3, the amount of change in (i.e., the step width of) the vehicle speed setting according to one operation of the cruise control lever 18 is changed from, for example, increments or decrements of 1 km/h (shown by the broken line) to increments or decrements of 5 km/h (as shown by the solid line). Also, as shown in FIG. 4, the amount of change in (i.e., the step width of) the vehicle speed setting when the cruise control lever 18 is operated once and held in that position, (i.e., either up or down) is changed from increments or decrements of 5 km/h (as shown by the broken like) to increments or decrements of 10 km/h (as shown by the solid line) which is twice that, and the time interval $\Delta T$ of that change is cut in half, i.e., is changed to half $\Delta T/2$. The time interval of this change indicates the duration of the operation until it is determined that the cruise control lever 18 is being held either up or down for an extended period of time (this may also be referred to as a "continuous operation" or "long operation"). Incidentally, the amount of change in the speed from a single short operation of the cruise control lever 18 may be regarded as a first predetermined amount of change, and the amount of change in the speed when the cruise control lever 18 is held either up or down for an extended period of time may be regarded as a second predetermined amount of change. In this way, a change in the change speed of the vehicle speed setting may refer to either a change in the amount of change in (i.e., the step width of) the vehicle speed setting, or a change in the time interval of the change, or both. The process then proceeds on to step S208.

In step S207, the change time setting portion 36 maintains (i.e., does not change) the change speed and the process proceeds on to step S208. More specifically, as shown in FIG. 3, the amount of change in (i.e., the step width of) the vehicle speed setting according to one operation of the cruise control lever 18 is maintained at increments or decrements of 1 km/h, for example. Also, as shown in FIG. 4, the amount of change in (i.e., the step width of) the vehicle speed setting when the cruise control lever 18 is operated once but held up or down for an extended period of time is maintained at increments or decrements of 5 km/h, for example, and the time interval of that change is maintained at $\Delta T$.

In step S208, the change instructing portion 38 outputs a command to change the vehicle speed setting at the change speed that was set in the change time setting portion 36. Accordingly, the driver is able to set the vehicle speed setting as desired without feeling odd while looking at the indicator 20. Then the throttle control apparatus 22 and the brake control apparatus 24 control the throttle opening amount and the brake pressure so that the speed of the vehicle comes to match the vehicle speed setting.

As described above in detail, in this example embodiment, the change speed of the vehicle speed setting can be changed according to the running environment of the vehicle, i.e., the road type, or more specifically, whether the vehicle is traveling in the passing lane or the traveling lane, and the vehicle speed setting can be changed at that set change speed. That is, by increasing the change speed of the vehicle speed setting when the vehicle is traveling in the passing lane, in which a there is a need to suddenly change speed, as compared with when the vehicle is traveling in the traveling lane, the speed setting that matches the road type is possible and the expectations of the driver can also be met.

Also, even if the vehicle is traveling in the traveling lane, when it has been detected that the blinker on the passing lane side is on, the change speed of the vehicle speed setting can be increased. As a result, it is possible to respond to a sudden speed change when the vehicle attempts to accelerate, change lanes into the passing lane and pass another vehicle or the like.

Next, a second example embodiment of the invention will be described. Incidentally, elements that are the same as those elements in the foregoing first example embodiment will be denoted by the same reference numerals and redundant descriptions will be omitted.

Figure 5:
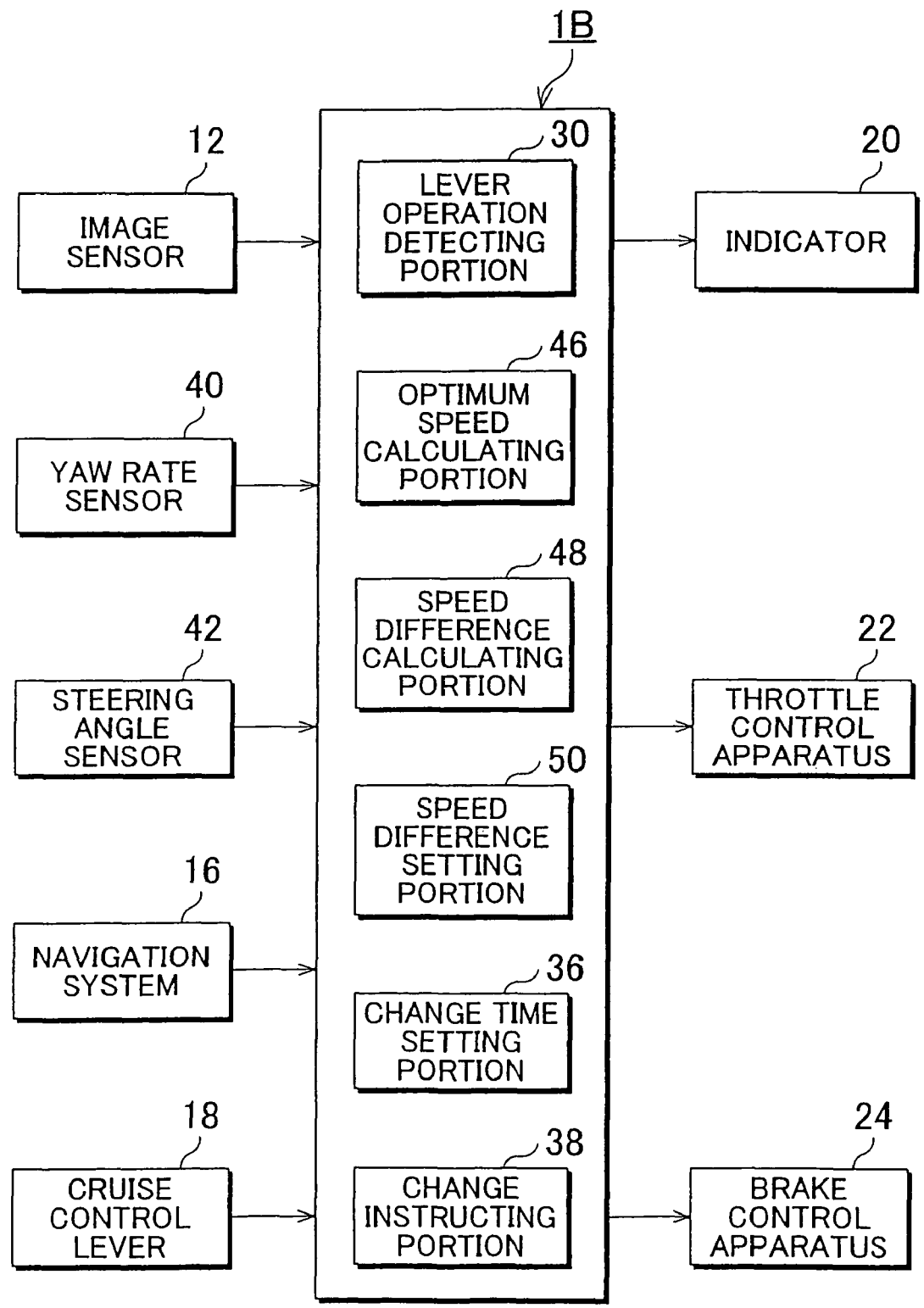
FIG. 5 is a block diagram of an apparatus for changing the vehicle speed setting according to a second example embodiment of the invention.

FIG. 5 is a block diagram of an apparatus for changing the vehicle speed setting according to the second example embodiment of the invention. As shown in FIG. 5, the input side of this apparatus 1B is connected to an image sensor 12, a yaw rate sensor 40, a steering angle sensor 42, a navigation system 16, and a cruise control lever 18.

The image sensor 12 is used, together with the navigation system 16 which guides the vehicle, to detect whether the vehicle is traveling on a curved road or a straight road, as well as the curvature of the curve and the curvature of a curve of the road along the route that it is estimated the vehicle will travel (hereinafter also simply referred to as an upcoming curve) by obtaining an image of the area around the vehicle.

Also, the yaw rate sensor 40 and the steering angle sensor 42 are used to detect whether the vehicle is traveling on a curved road or a straight road by detecting the yaw rate and the steering angle, respectively. Also, the yaw rate sensor 40 and the steering angle sensor 42 are used to detect the curvature of the curve of the road on which the vehicle is traveling. Incidentally, the yaw rate sensor 40 and the steering angle sensor 42 may also be used together with the image sensor 12 and the navigation system 16, or may alternatively be omitted. Also, the yaw rate sensor 40 and the steering angle sensor 42 may be used and the image sensor 12 and the navigation system 16 not used.

The cruise control lever 18 is the same as that described in the first example embodiment. Also, the output side of this apparatus 1B is connected to an indicator 20, a throttle control apparatus, 22, and a brake control apparatus 24, just as in the first example embodiment.

As shown in FIG. 5, the apparatus 1B includes a lever operation detecting portion 30, an optimum speed calculating portion 46, a speed difference calculating portion 48, a speed difference setting portion 50, a change time setting portion 36, and a change instructing portion 38.

The lever operation detecting portion 30 detects an operation of the cruise control lever 18 by the driver. The optimum speed calculating portion 46 calculates an optimum speed V2 for the curve of the road on which the vehicle is traveling according to the curvature of that curve based on information from the image sensor 12 and the navigation system 16. The optimum speed calculating portion 46 also calculates an optimum speed V1 for an upcoming curve according to the curvature of that curve based on information from the image sensor 12 and the navigation system 16. Incidentally, the accuracy of the calculation of the optimum speed V2 can be improved by also referencing the information from the yaw rate sensor 40 and the steering angle sensor 42.

The speed difference calculating portion 48 calculates a speed difference 1 between the current vehicle speed setting and the calculated optimum speed V1. Also, the speed difference calculating portion 48 calculates a speed difference 2 between the current vehicle speed setting and the calculated optimum speed V2. The speed difference setting portion 50 determines whether the speed difference 1 and the speed difference 2 are positive values, and if at least one is, then compares the speed difference 1 with the speed difference 2.

If the speed difference 2 is larger, then it is used as the speed difference for calculating the change speed of the vehicle speed setting (hereinafter this speed difference will be referred to as the "calculation speed difference"), which will be described later. If, on the other hand, the speed difference 1 is larger, then it is used as the calculation speed difference.

The change time setting portion 36 changes the change speed of the vehicle speed setting according to the running environment of the vehicle, i.e., the road type, or more specifically, whether the vehicle is traveling on a straight road or on a curved road, and the speed difference between the vehicle speed setting and the optimum speed for the curve when the vehicle is traveling on a curved road. The specific method for changing the change speed of the vehicle speed setting will be described in detail later.

The change instructing portion 38 outputs a command to the change the vehicle speed setting at the change speed that was set by the change time setting portion 36 in response to an operation of the cruise control lever 18 by the driver. A signal indicative of the vehicle speed setting of cruise control that was set in this manner is then sent to the throttle control apparatus 22 and the brake control apparatus 24, and the speed of the vehicle is controlled accordingly.

Figure 6:
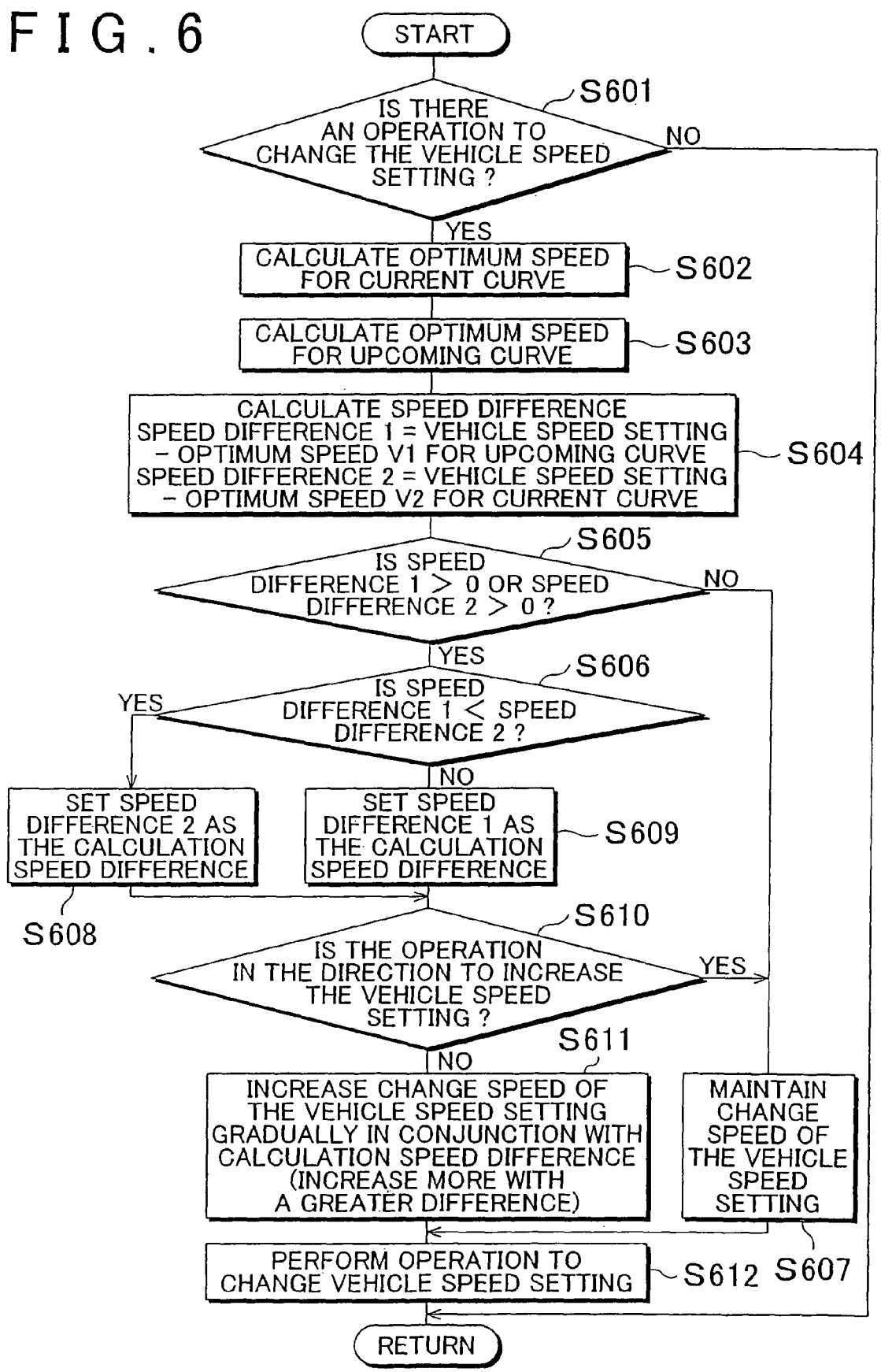
FIG. 6 is a flowchart illustrating a method for changing the vehicle speed setting in the second example embodiment.

Next, the method for changing the vehicle speed setting by the apparatus 1B for changing the vehicle speed setting described above will be described with reference to the flow-chart shown in FIG. 6.

First, the lever operation detecting portion 30 detects whether there is an operation to change the vehicle speed setting by detecting whether the driver is operating the cruise control lever 18 (step S601). If the cruise control lever 18 is being operated, the process proceeds on to step S602. If, on the other hand, the cruise control lever 18 is not being operated, this cycle of the routine ends.

In step S602, the optimum speed calculating portion 46 calculates the optimum speed V2 for the curve of the road on which the vehicle is traveling according to the curvature of the curve based on the information from the image sensor 12 and the navigation system 16. Then in step S603, the optimum speed calculating portion 46 calculates the optimum speed V1 for an upcoming curve according to the curvature of that curve. Incidentally, the accuracy of the calculation of the optimum speed V2 may be improved by referencing the information from the yaw rate sensor 40 and the steering angle sensor 42.

Next, in step S604, the speed difference calculating portion 48 calculates both the speed difference 1 between the current vehicle speed setting and the calculated optimum speed V1, and the speed difference 2 between the current vehicle speed setting and the calculated optimum speed V2. Next, in step S605, the speed difference setting portion 50 determines whether the speed difference 1 and the speed difference 2 are positive values. Then in step S606, if at least one of the speed difference 1 and the speed difference 2 is a positive value, the speed difference setting portion 50 compares the speed difference 1 with the speed difference 2. If the speed difference 2 is greater, the speed difference 2 is employed in step S608 as the calculation speed difference for calculating the change speed of the vehicle speed setting which will be described later. On the other hand, if the speed difference 1 is greater, the speed difference 1 is employed in step S609 as the calculation speed difference.

Figure 7:
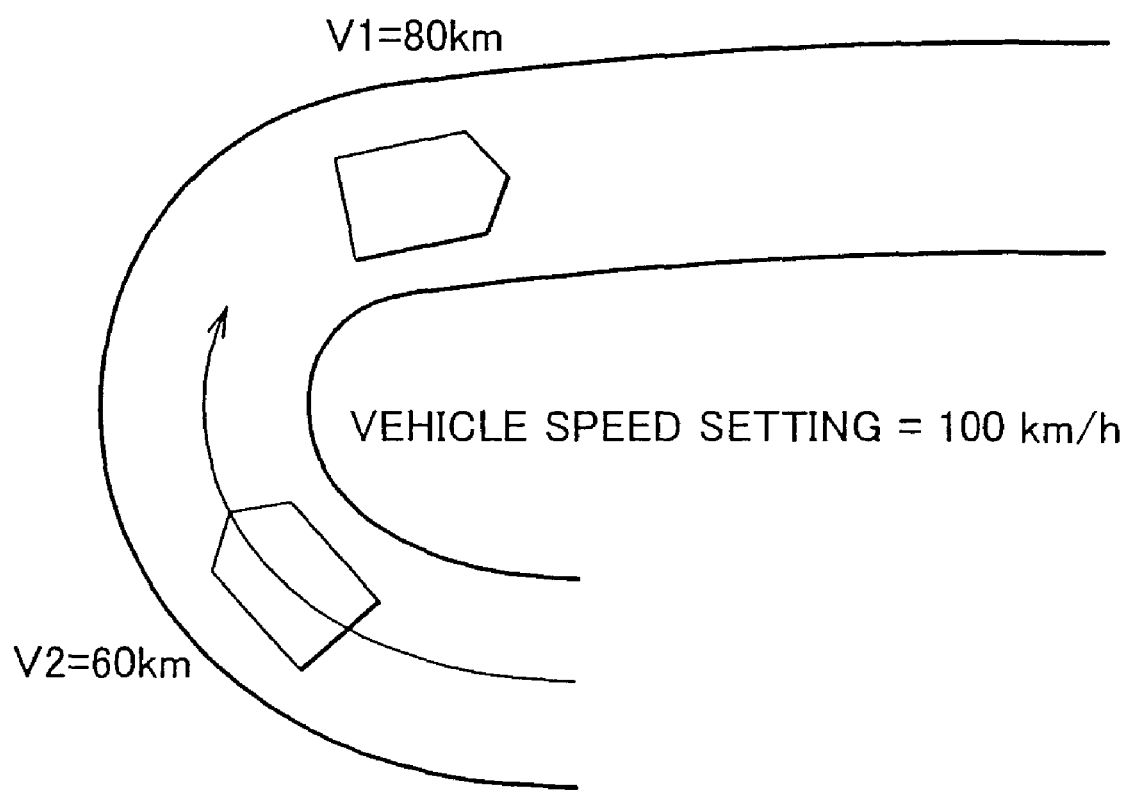
FIG. 7 is a view showing the relationship between the vehicle speed setting and the optimum vehicle speed when cornering.

More specifically, let us assume that the current vehicle speed setting is 100 km/h and the optimum speed V2 for a curve of the road on which the vehicle is traveling is 60 km/h, and furthermore, the optimum speed V1 of an upcoming curve is 80 km/h, as shown in FIG. 7. In this case, the speed difference 2 is 40 km/h and the speed difference 1 is 20 km/h. Thus, the speed difference 2 is greater so the speed difference setting portion 50 sets the speed difference 2, i.e., 40 km/h, as the calculation speed difference. Setting the larger speed difference as the calculation speed difference in this way makes it possible to handle the more severe condition.

Next, in step S610, the lever operation detecting portion 30 detects whether the cruise control lever 18 is being operated in a direction that increases the vehicle speed setting. If so, the process proceeds on to step S607. If not, i.e., if the cruise control lever 18 is being operated in a direction that decreases the vehicle speed setting, the process proceeds on to step S611.

In step S611, the change time setting portion 36 sets the change speed gradually larger in conjunction with the calculation speed difference set in step S608 or S609. More specifically, as illustrated by the example shown in FIG. 7, the change time setting portion 36 sets the change speed corresponding to 40 km/h as the calculation speed difference. The process then proceeds on to step S612.

Meanwhile, in step S607, the change time setting portion 36 maintains (i.e., does not change) the change speed and the process proceeds on to step S612. That is, the process proceeds on to step S607 when either it has been determined in step S605 that the optimum speed for a curve that the vehicle is or will be on is greater than the vehicle speed setting or when it has been determined in step S610 that the cruise control lever 18 is being operated in a direction that increases vehicle speed setting. Accordingly, if it has been determined that the optimum speed for the curve is greater than the vehicle speed setting, there is no need to change the vehicle speed setting. Also, if the cruise control lever 18 is being operated in the direction that increases the vehicle speed setting on a curve, there is no need to suddenly increase the vehicle speed. In either case, therefore, the change speed of the vehicle speed setting will not change.

In step S612, the change instructing portion 38 outputs a command to change the vehicle speed setting at the change speed set in the change time setting portion 36. As a result, the driver is able to set the vehicle speed setting as desired without feeling odd while looking at the indicator 20. Then the throttle control apparatus 22 and the brake control apparatus 24 control the throttle opening amount and the brake pressure so that the speed of the vehicle comes to match the vehicle speed setting.

As described above in detail, in this example embodiment, the change speed of the vehicle speed setting can be changed according to the running environment of the vehicle, i.e., the road type, or more specifically, whether the vehicle is traveling on a straight road or on a curved road, and the vehicle speed setting can be changed at that set change speed. That is, it is conceivable that the driver may want to immediately reduce the vehicle speed setting while traveling on a curved stretch of road (or right before a curve) compared to when traveling on a straight stretch of road. Increasing the change speed of the vehicle speed setting in this way makes it possible to quickly reduce the vehicle speed setting and meet the expectations of the driver.

Also, the change speed of the vehicle speed setting is set according to the speed difference between the vehicle speed setting and the optimum speed for that curve so when the vehicle speed setting is changed, the change speed can initially be increased (i.e., made faster) and then returned to the same change speed as the change speed of a normal operation as the vehicle speed setting approaches the optimum speed.

Next, a third example embodiment of the invention will be described. Incidentally, elements that are the same as those elements in the foregoing first example embodiment will be denoted by the same reference numerals and redundant descriptions will be omitted.

Figure 9:
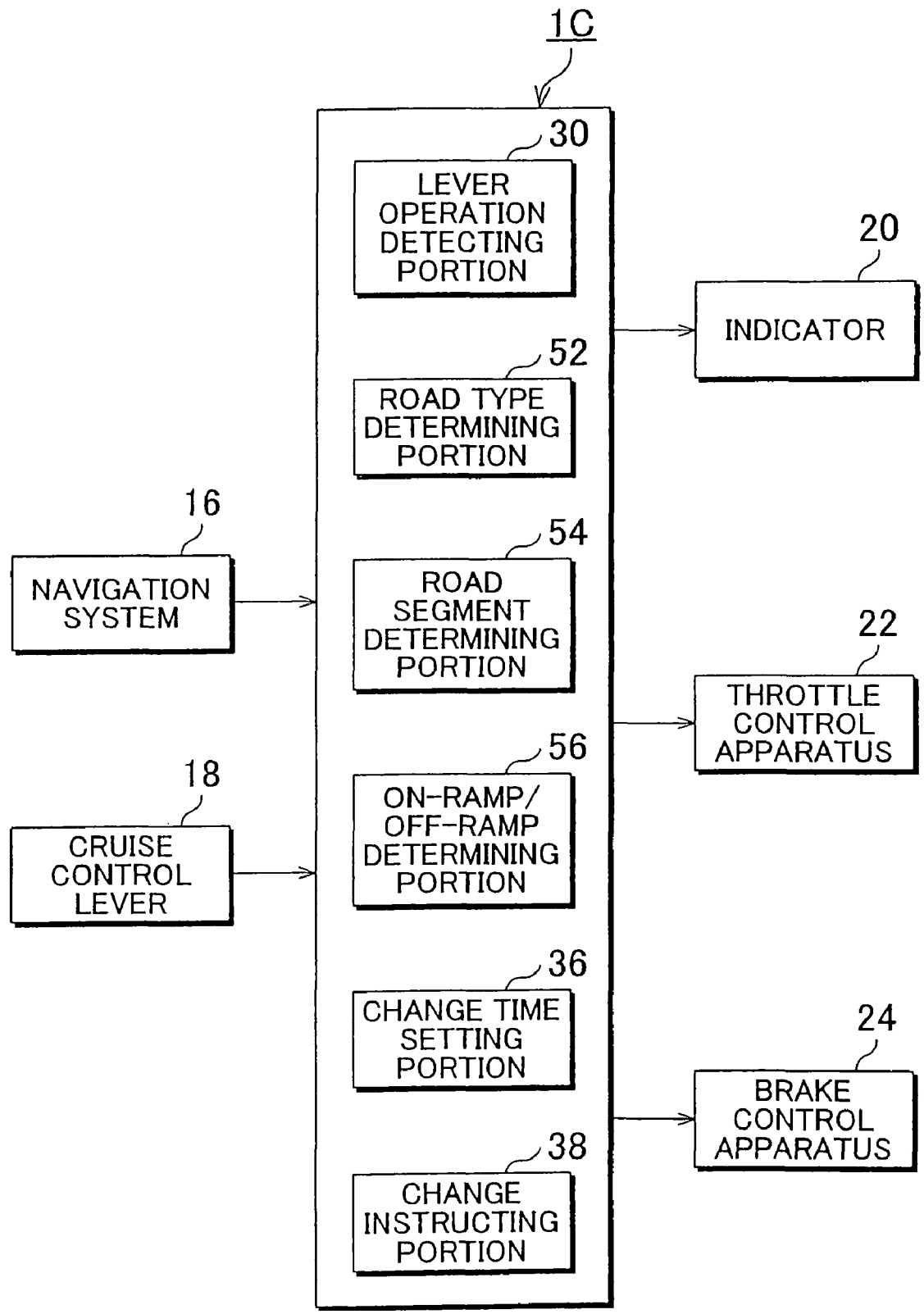
FIG. 9 is a block diagram of an apparatus for changing the vehicle speed setting according to a third example embodiment of the invention.

FIG. 9 is a block diagram of an apparatus for changing the vehicle speed setting according to the third example embodiment of the invention. As shown in FIG. 9, the input side of this apparatus 1C is connected to a navigation system 16 and a cruise control lever 18.

The navigation system 16 is used to obtain road information regarding, for example, road type, road segment, on-ramps and off-ramps of expressways, and the like. The cruise control lever 18 is the same as that described in the first example embodiment. Also, the output side of this apparatus 1C is connected to an indicator 20, a throttle control apparatus 22, and a brake control apparatus 24, similar to the first example embodiment.

As shown in FIG. 9, the apparatus 1C includes a lever operation detecting portion 30, a road type determining portion 52, a road segment determining portion 54, an on-ramp/off-ramp determining portion 56, a change time setting portion 36, and a change instructing portion 38.

The lever operation detecting portion 30 detects an operation of the cruise control lever 18 by the driver. The road type determining portion 52 determines whether the vehicle is currently traveling on an ordinary road (with the exception of large roads such as national highways) or an expressway based on information from the navigation system 16. The road segment determining portion 54 determines whether vehicle is traveling in a through lane of an expressway or on an on-ramp/off-ramp of an expressway based on information from the navigation system 16. The on-ramp/off-ramp determining portion 56 determines whether, when the road segment determining portion 54 has determined that the vehicle is traveling on an on-ramp/off-ramp, the vehicle is on an on-ramp leading to a through lane or on an off-ramp leading from a through lane.

The change time setting portion 36 changes the change speed of the vehicle speed setting according to the running environment of the vehicle, i.e., the road type, or more specifically, mainly whether the vehicle is traveling on an ordinary road or an expressway, and if it is an expressway, whether the vehicle is traveling in a through lane or on an on-ramp/off-ramp, and further, if the vehicle is traveling on an on-ramp/off-ramp, whether it is an on-ramp leading to a through lane or an off-ramp leading from a through lane. The method for changing the change speed of the vehicle speed setting will be described in detail later.

The change instructing portion 38 changes the vehicle speed setting at the change speed that was set by the change time setting portion 36 in response to an operation of the cruise control lever 18 by the driver. A signal indicative of the vehicle speed setting of cruise control that was set in this manner is then sent to the throttle control apparatus 22 and the brake control apparatus 24, and the speed of the vehicle is controlled accordingly.

Figure 10:
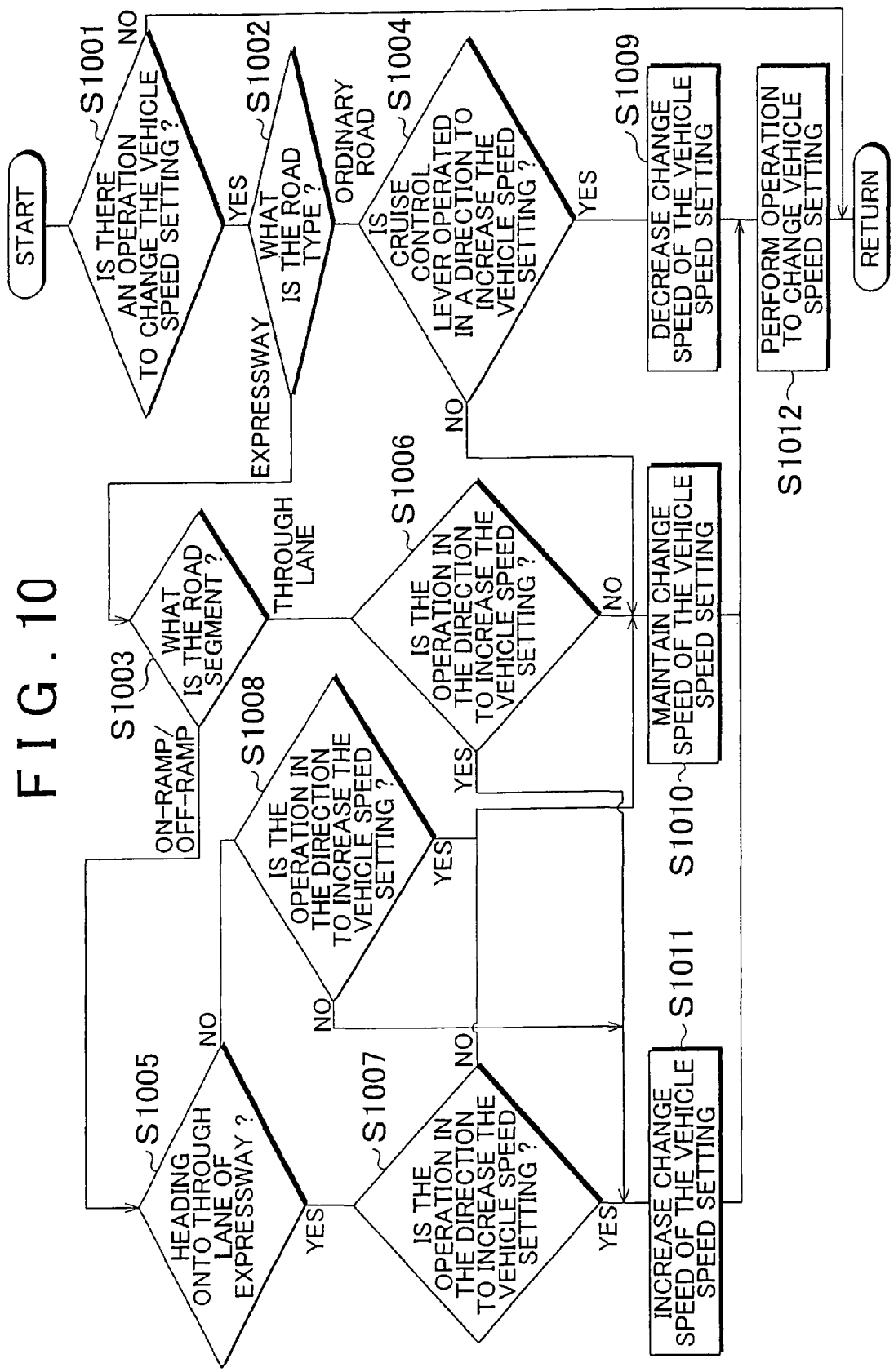
FIG. 10 is a flowchart illustrating a method for changing the vehicle speed setting in the third example embodiment.

Next, the method for changing the vehicle speed setting by the apparatus 1C for changing the vehicle speed setting described above will be described with reference to the flowchart shown in FIG. 10.

First, the lever operation detecting portion 30 detects whether there is an operation to change the vehicle speed setting by detecting whether the driver is operating the cruise control lever 18 (step S1001). If the cruise control lever 18 is being operated, the process proceeds on to step S1002. If, on the other hand, the cruise control lever 18 is not being operated, this cycle of the routine ends.

In step S1002, the road type determining portion 52 determines whether the vehicle is currently traveling on an ordinary road (with the exception of large roads such as national highways) or an expressway based on information from the navigation system 16. If the vehicle is traveling on an expressway, the process proceeds on to step S1003. If, on the other hand, the vehicle is traveling on an ordinary road, the process proceeds on to step S1004.

In step S1003, the road segment determining portion 54 determines whether the vehicle is traveling in a through lane of the expressway or on an on-ramp/off-ramp of the expressway based on information from the navigation system 16. If the vehicle is traveling on an on-ramp, the process proceeds to step S1005. If, on the other hand, the vehicle is traveling in a through lane, the process proceeds on to step S1006.

Next, in step S1005, the on-ramp/off-ramp determining portion 56 determines whether the vehicle is traveling on an on-ramp leading to a through lane or on an off-ramp leading from a through lane. If the vehicle is traveling on an on-ramp, the process proceeds on to step S1007. If, on the other hand, the vehicle is traveling on an off-ramp, the process proceeds on to step S1008.

In step S1004, the lever operation detecting portion 30 detects whether the cruise control lever 18 is being operated in the direction that increases the vehicle speed setting. If so, the process proceeds on to step S1009. If not, i.e., if the cruise control lever is being operated in the direction that decreases the vehicle speed setting, the process proceeds on to step S1010.

Also, in step S1006 as well, the lever operation detecting portion 30 detects whether the cruise control lever 18 is being operated in the direction that increases the vehicle speed setting. If so, the process proceeds on to step S1011. If not, i.e., if the cruise control lever is being operated in the direction that decreases the vehicle speed setting, the process proceeds on to step S1010.

Similarly, in step S1007, the lever operation detecting portion 30 detects whether the cruise control lever 18 is being operated in the direction that increases the vehicle speed setting. If so, the process proceeds on to step S1011. If not, i.e., if the cruise control lever is being operated in the direction that decreases the vehicle speed setting, the process proceeds on to step S1010.

In step S1008 as well, the lever operation detecting portion 30 detects whether the cruise control lever 18 is being operated in the direction that increases the vehicle speed setting. If so, the process proceeds on to step S1010. If not, i.e., if the cruise control lever is being operated in the direction that decreases the vehicle speed setting, the process proceeds on to step S1011.

Figure 11:
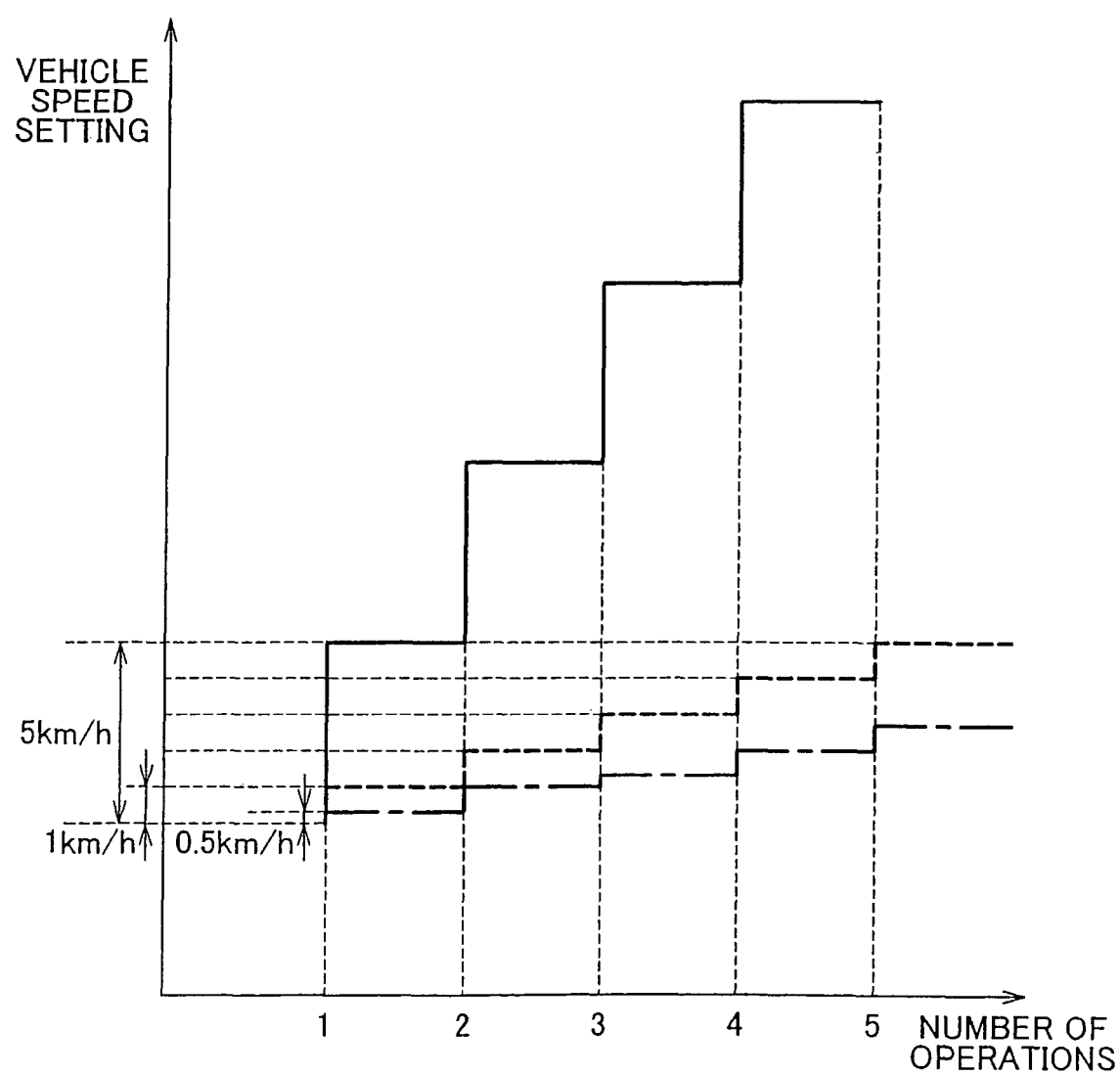
FIG. 11 is a graph showing a specific example of the method for changing the vehicle speed setting during a short operation of the cruise control lever.
Figure 12:
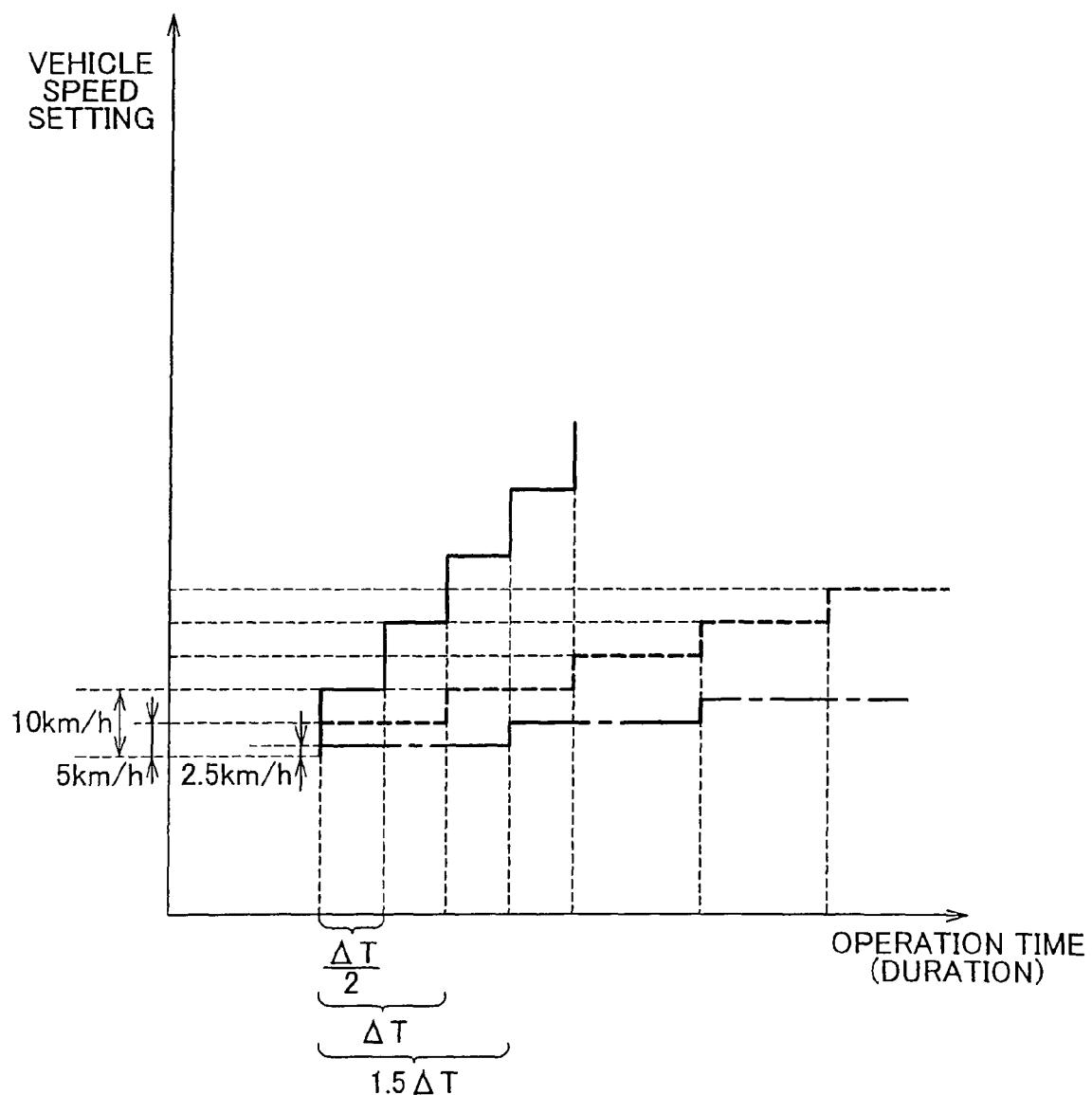
FIG. 12 is a graph showing a specific example of the method for changing the vehicle speed setting during a long operation of the cruise control lever.

In step S1009, the change time setting portion 36 sets the change speed so that it is slower. More specifically, as shown in FIG. 11, the change time setting portion 36 changes the amount of change in (i.e., the step width of) the vehicle speed setting in response to one short operation of the cruise control lever 18 from increments or decrements of 1 km/h (as shown by the broken line) to increments or decrements of 0.5 km/h (as shown by the alternate long and short dash line), for example. Also, as shown in FIG. 12, the change time setting portion 36 changes the amount of change in (i.e., the step width of) the vehicle speed setting when the cruise control lever 18 is operated once but held up or down for an extended period of time from increments or decrements of 5 km/h (as shown by the broken line) to increments or decrements of 2.5 km/h which is half that (as shown by the alternate long and short dash line) and changes the time interval ΔT of that change to 1.5×ΔT, i.e., increases the time interval ΔT of that change by 50%, for example. In this way, a change in the change speed of the vehicle speed setting refers to either a change in the amount of change in (i.e., the step width of) the vehicle speed setting, or a change in the time interval of the change, or both, just as in the foregoing first example embodiment. The process then proceeds on to step S1012.

In step S1010, the change time setting portion 36 maintains (i.e., does not change) the change speed. More specifically, as shown in FIG. 11, the amount of change in (i.e., the step width of) the vehicle speed setting according to one short operation of the cruise control lever 18 is maintained at increments or decrements of 1 km/h (as shown by the broken line), for example. Also, as shown in FIG. 12, the amount of change in (i.e., the step width of) the speed setting when the cruise control lever 18 is operated once but held up or down for an extended period of time is maintained at increments or decrements of 5 km/h (as shown by the broken line). Then the process proceeds on to step S1012.

In step S1011, the change time setting portion 36 sets the change speed so that it is faster, i.e., increases the change speed. More specifically, as shown in FIG. 11, the change time setting portion 36 changes the amount of change in (i.e., the step width of) the vehicle speed setting according to one short operation of the cruise control lever 18 from 1 km/h (as shown by the broken line) to 5 km/h (as shown by the solid line), for example. Also, as shown in FIG. 12, the change time setting portion 36 changes the amount of change in (i.e., the step width of) the vehicle speed setting when the cruise control lever 18 is operated once but held up or down for an extended period of time from increments or decrements of 5 km/h (as shown by the broken line) to increments or decrements of 10 km/h (as shown by the solid line) which is half that, and changes the time interval ΔT of that change to ΔT/2, which is half. In this way, a change in the change speed of the vehicle speed setting refers to either a change in the amount of change in (i.e., the step width of) the vehicle speed setting, or a change in the time interval of the change, or both, just as in the foregoing first example embodiment. The process then proceeds on to step S1012.

In step S1012, the change instructing portion 38 outputs a command to change the vehicle speed setting at the change speed set in the change time setting portion 36. As a result, the driver is able to set the vehicle speed setting as desired without feeling odd while looking at the indicator 20. Then the throttle control apparatus 22 and the brake control apparatus 24 control the throttle opening amount and the brake pressure so that the speed of the vehicle comes to match the vehicle speed setting.

As described above in detail, in this example embodiment, the change speed of the vehicle speed setting can be changed according to the running environment of the vehicle, i.e., mainly whether the vehicle is traveling on an ordinary road or an expressway, and if it is an expressway, whether the vehicle is traveling in a through lane or on an on-ramp/off-ramp, and further, if the vehicle is traveling on an on-ramp/off-ramp, whether it is an on-ramp leading to a through lane or an off-ramp leading from a through lane. The vehicle speed setting can then be changed at the change speed that was set.

That is, when the vehicle is traveling on an on-ramp or in a through lane of an expressway, there is a need to quickly increase vehicle speed setting. Conversely, if the vehicle is traveling on an off-ramp of an expressway, there is a need to quickly decrease the vehicle speed setting. Also, if the vehicle is traveling on an ordinary road, there is no need to quickly change the vehicle speed setting so it is often safest to increase it gradually. Conversely, when decreasing the vehicle speed setting, it is often safest to decrease it quickly. In this case, the vehicle speed setting can be changed according to the running environment at the time so the expectations of the driver can be met.

Next, a fourth example embodiment of the invention will be described. Incidentally, elements that are the same as those elements in the foregoing first example embodiment will be denoted by the same reference numerals and redundant descriptions will be omitted. Here in this fourth example embodiment, it is presumed that the vehicle is provided with an ACC (adaptive cruise control) system that sets the vehicle speed setting as an upper limit and matches the speed of a leading vehicle while maintaining a set distance from that vehicle.

Figure 13:
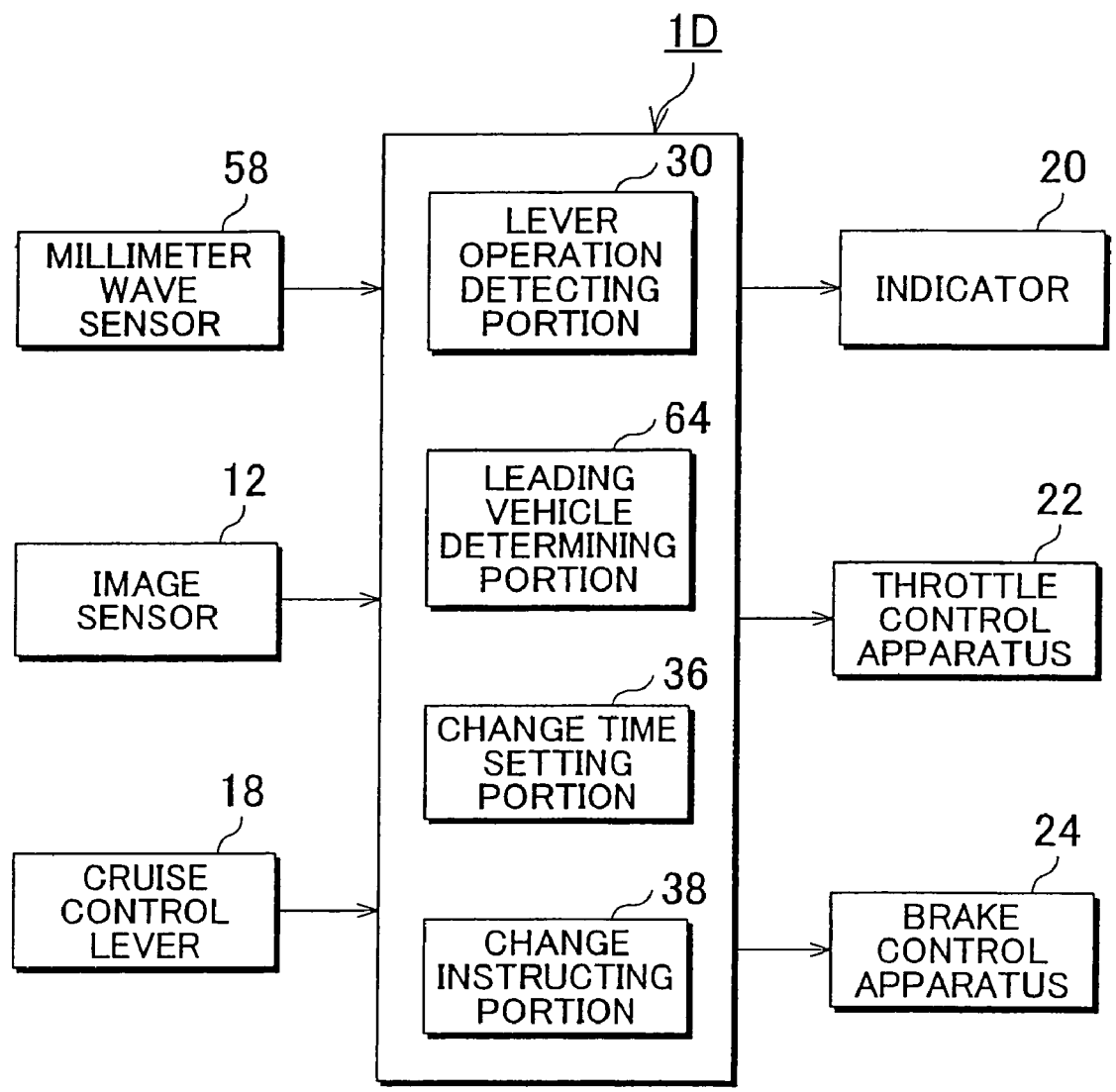
FIG. 13 is a block diagram of an apparatus for changing the vehicle speed setting according to a fourth example embodiment of the invention.

FIG. 13 is a block diagram of an apparatus for changing the vehicle speed setting according to the fourth example embodiment of the invention. As shown in the drawing, the input side of this apparatus 1D is connected to a millimeter wave sensor 58, an image sensor 12, and a cruise control lever 18.

The millimeter wave sensor 58 is a radar that detects an object by sending out millimeter waves and receiving the waves that reflect off of the object, and is used to detect a leading vehicle. The image sensor 12 is used, together with the millimeter wave sensor 58, to detect the leading vehicle by obtaining images of the area around the vehicle. The cruise control lever 18 is to activate and deactivate the ACC by an on/off operation by the driver, as well as to change the vehicle speed setting by being operated up or down by the driver. For example, during normal operation, the vehicle speed setting is increased or decreased in increments or decrements of 1 km/h every time the cruise control lever 18 is operated up or down once. Also, when the cruise control lever 18 is held up or down for an extended period of time, the vehicle speed setting increases or decreases in increments or decrements of 5 km/h.

Also, the output side of the apparatus 1D is connected to an indicator 20, a throttle control apparatus 22, and a brake control apparatus 24, similar to the first example embodiment.

As shown in FIG. 13, the apparatus 1D includes a lever operation detecting portion 30, a leading vehicle determining portion 64, a change time setting portion 36, and a change instructing portion 38.

The lever operation detecting portion 30 detects an operation of the cruise control lever 18 by the driver. The leading vehicle determining portion 64 determines whether there is a vehicle ahead of the host vehicle (i.e., a leading vehicle) based on information from the millimeter wave sensor 58 and the image sensor 12. The change time setting portion 36 changes the change speed of the vehicle speed setting according to the running conditions of the vehicle, i.e., whether or not there is a leading vehicle according to the ACC system. The method for changing the change speed of the vehicle speed setting will be described in detail later.

The change instructing portion 38 outputs a command to change the vehicle speed setting at the change speed that was set by the change time setting portion 36 in response to an operation of the cruise control lever 18 by the driver. A signal indicative of the vehicle speed setting that was set in this manner is then sent to the throttle control apparatus 22 and the brake control apparatus 24, and the speed of the vehicle is controlled accordingly.

Figure 14:
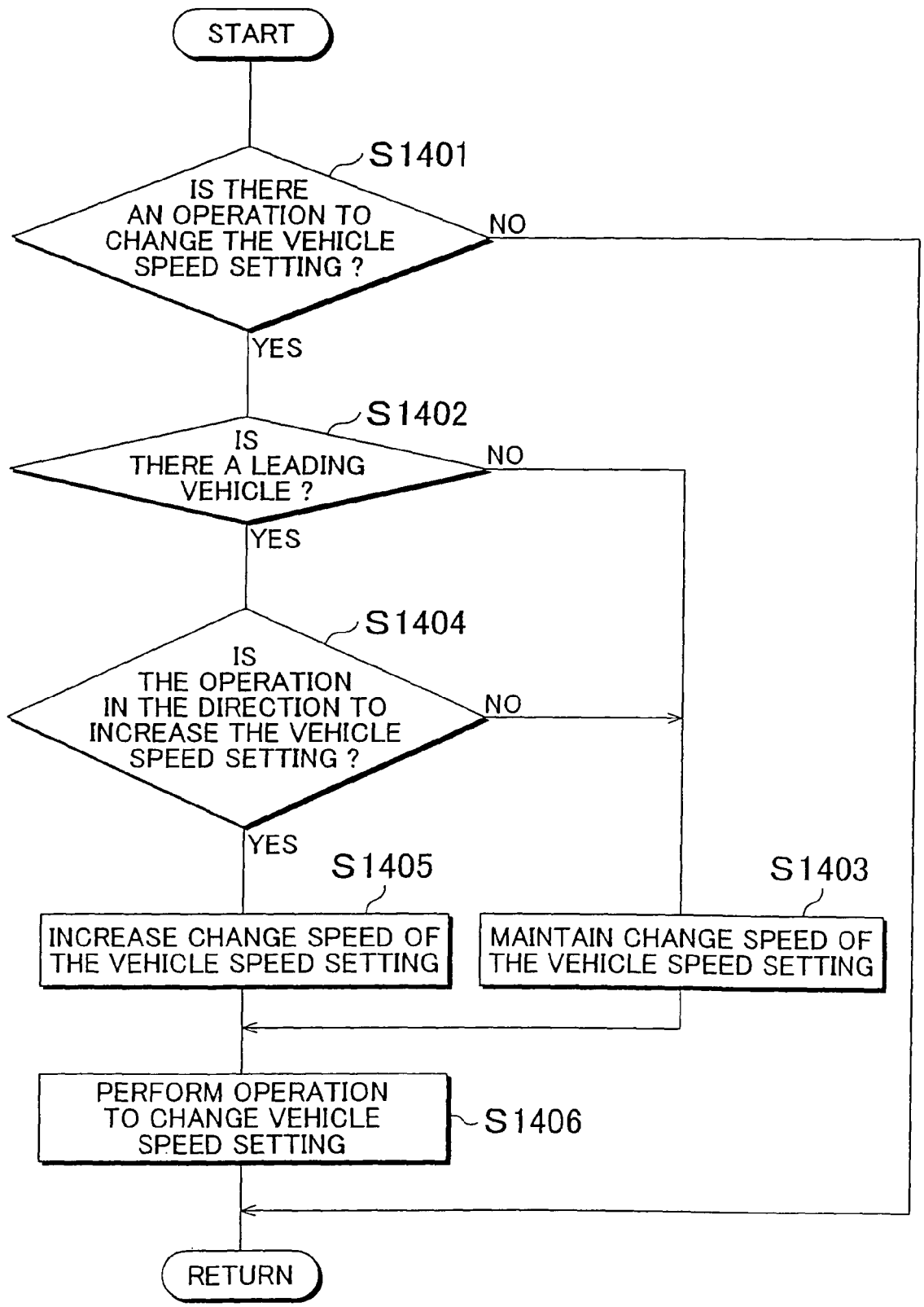
FIG. 14 is a flowchart illustrating a method for changing the vehicle speed setting in the fourth example embodiment.

Next, a method for changing the vehicle speed setting according to the apparatus 1D for changing the vehicle speed setting described above will be described with reference to the flowchart shown in FIG. 14.

First, the lever operation detecting portion 30 detects whether there is an operation to change the vehicle speed setting by detecting whether the driver is operating the cruise control lever 18 (step S1401). If the cruise control lever 18 is being operated, the process proceeds on to step S1402. If, on the other hand, the cruise control lever 18 is not being operated, this cycle of the routine ends.

In step S1402, it is determined whether there is a leading vehicle based on information from the millimeter wave sensor 58 and the image sensor 12. If there is a leading vehicle, the process proceeds on to step S1404. If, on the other hand, there is no leading vehicle, the process proceeds on to step S1403.

In step S1404, the lever operation detecting portion 30 detects whether the cruise control lever 18 is being operated in a direction that increases the vehicle speed setting. If so, the process proceeds on to step S1405. If not, i.e., if the cruise control lever 18 is being operated in a direction that decreases the vehicle speed setting, the process proceeds on to step S1403.

In step S1405, the change time setting portion 36 sets the change speed so that it is faster (i.e., increases the change speed) in the same manner as described in detail with reference to FIGS. 3 and 4. Then the process proceeds on to step S1406. On the other hand, in step S1403, the change time setting portion 36 maintains (i.e., does not change) the change speed and the process proceeds on to step S1406.

In step S1406, the change instructing portion 38 outputs a command to change the vehicle speed setting at the change speed that was set in the change time setting portion 36. Accordingly, the driver is able to set the vehicle speed setting as desired without feeling odd while looking at the indicator 20. Then the throttle control apparatus 22 and the brake control apparatus 24 control the throttle opening amount and the brake pressure so that the speed of the vehicle comes to match the vehicle speed setting.

As described above in detail, in this example embodiment, the change speed of the vehicle speed setting can be changed according to the running environment of the vehicle, i.e., whether or not there is a leading vehicle according to the ACC system, and the vehicle speed setting can be changed at that set change speed. That is, when the vehicle is following a leading vehicle and that leading vehicle accelerates, the host vehicle will be left behind if the vehicle speed setting is slower than the speed of the leading vehicle. Therefore in this case it is necessary to quickly increase the vehicle speed setting. In this case, by increasing the change speed of the vehicle speed setting when a leading vehicle is detected, it is possible to avoid such a problem. Accordingly, the vehicle speed setting can made appropriate for the running environment and meet the expectations of the driver.

Next, a fifth example embodiment of the invention will be described. Incidentally, elements that are the same as those elements in the foregoing first example embodiment will be denoted by the same reference numerals and redundant descriptions will be omitted.

Figure 15:
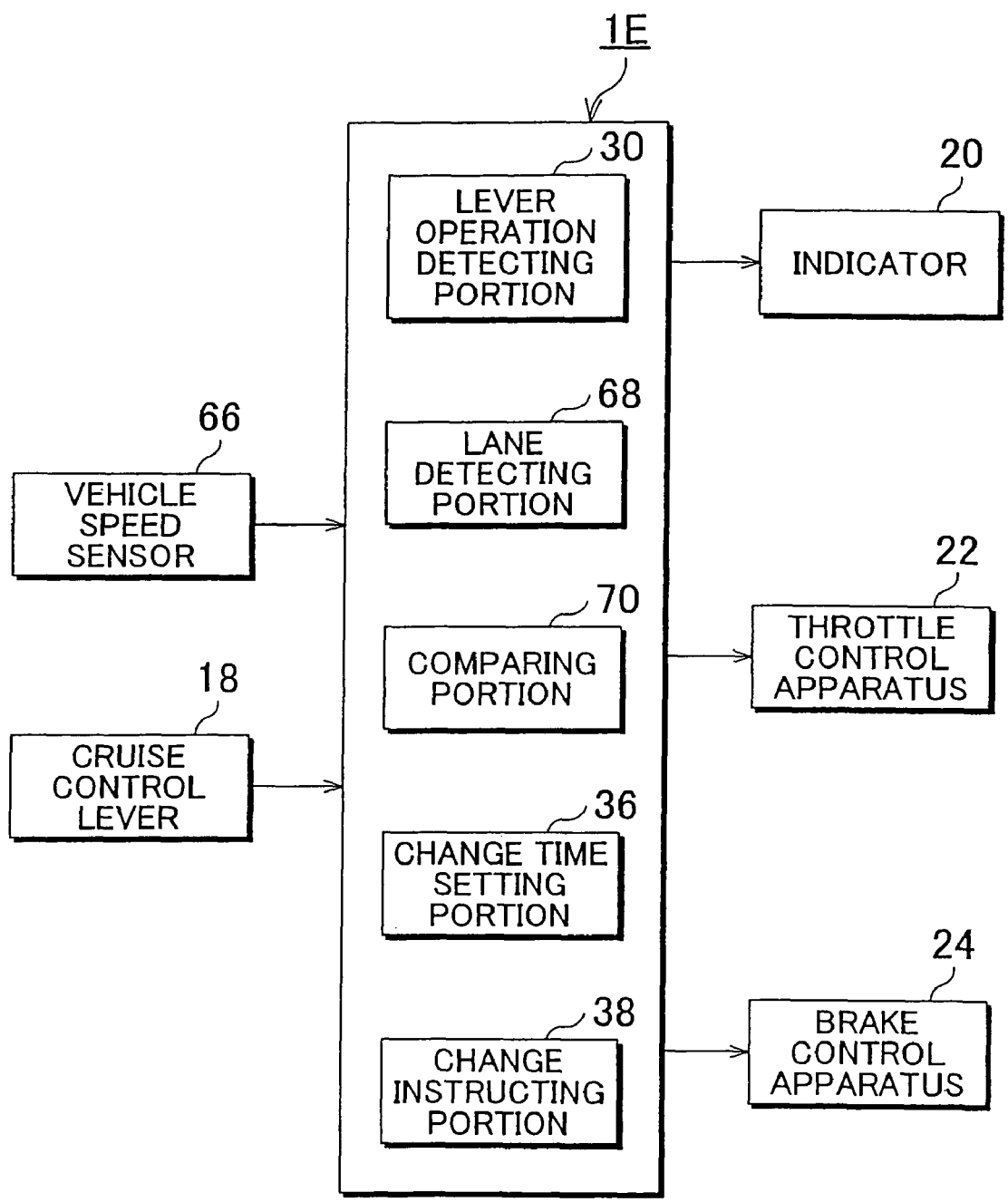
FIG. 15 is a block diagram of an apparatus for changing the vehicle speed setting according to a fifth example embodiment of the invention.

FIG. 15 is a block diagram of an apparatus for changing the vehicle speed setting according to the fifth example embodiment of the invention. As shown in the drawing, the input side of the apparatus 1E is connected to a vehicle speed sensor 66 and a cruise control lever 18.

The vehicle speed sensor is used to detect the speed of the vehicle. The cruise control lever 18 is used to change the vehicle speed setting of cruise control according to an upward or downward operation by the driver.

Also, the output side of the apparatus 1E is connected to an indicator 20, a throttle control apparatus 22, and a brake control apparatus 24, similar to the first example embodiment.

As shown in FIG. 15, the apparatus 1E includes a lever operation detecting portion 30, a vehicle speed detecting portion 68, a comparing portion 70, a change time setting portion 36, and a change instructing portion 38.

The lever operation detecting portion 30 detects whether the driver is operating the cruise control lever 18. The vehicle speed detecting portion 68 detects the speed of the vehicle based on information from the vehicle speed sensor 66. The comparing portion 70 compares the speed of the vehicle with a predetermined threshold value 1. The change time setting portion 36 changes the change speed of the vehicle speed setting according to the vehicle speed when the speed of the vehicle is greater than the threshold value 1. The method for changing the change speed of the vehicle speed setting will be described in detail later.

The change instructing portion 38 outputs a command to change the vehicle speed setting at the change speed that was set by the change time setting portion 36 in response to an operation of the cruise control lever 18 by the driver. A signal indicative of the vehicle speed setting in the cruise control that was set in this manner is then sent to the throttle control apparatus 22 and the brake control apparatus 24, and the speed of the vehicle is controlled accordingly.

Figure 16:
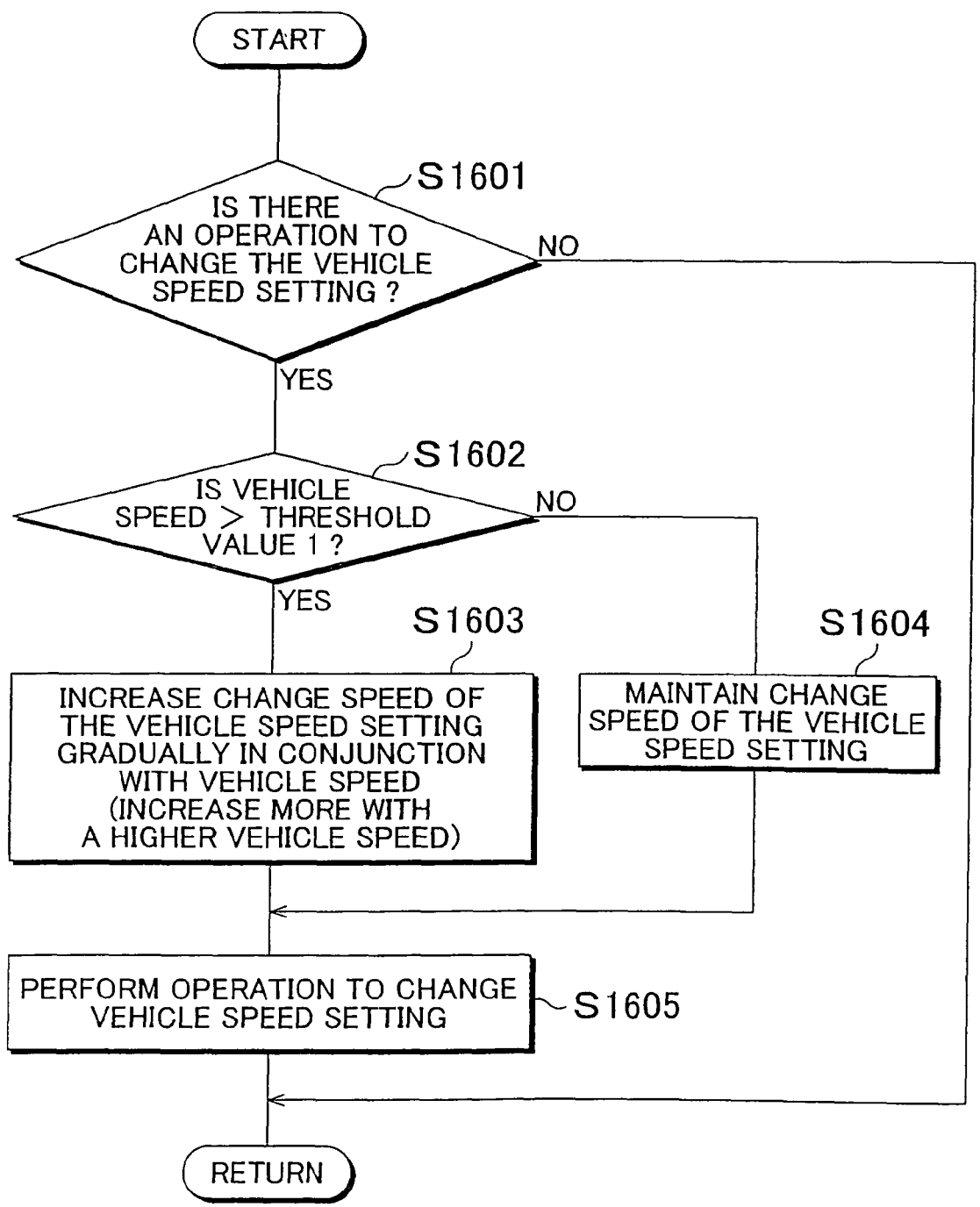
FIG. 16 is a flowchart illustrating a method for changing the vehicle speed setting in the fifth example embodiment.

Next, the method for changing the vehicle speed setting by the apparatus 1E for changing the vehicle speed setting described above will be described with reference to the flowchart shown in FIG. 16.

First, the lever operation detecting portion 30 detects whether there is an operation to change the vehicle speed setting by detecting whether the driver is operating the cruise control lever 18 (step S1601). If the cruise control lever 18 is being operated, the process proceeds on to step S1602. If, on the other hand, the cruise control lever 18 is not being operated, this cycle of the routine ends.

In step S1602, the vehicle speed detecting portion 68 detects the speed of the vehicle based on information from the vehicle speed sensor 66, and then the comparing portion 70 compares the detected vehicle speed with the threshold value 1. The threshold value 1 is 100 km/h, for example. If the vehicle speed is greater than the threshold value 1, then the process proceeds on to step S1603. If, on the other hand, the vehicle speed is equal to or less than the threshold value 1, the process proceeds on to step S1604.

Figure 8:
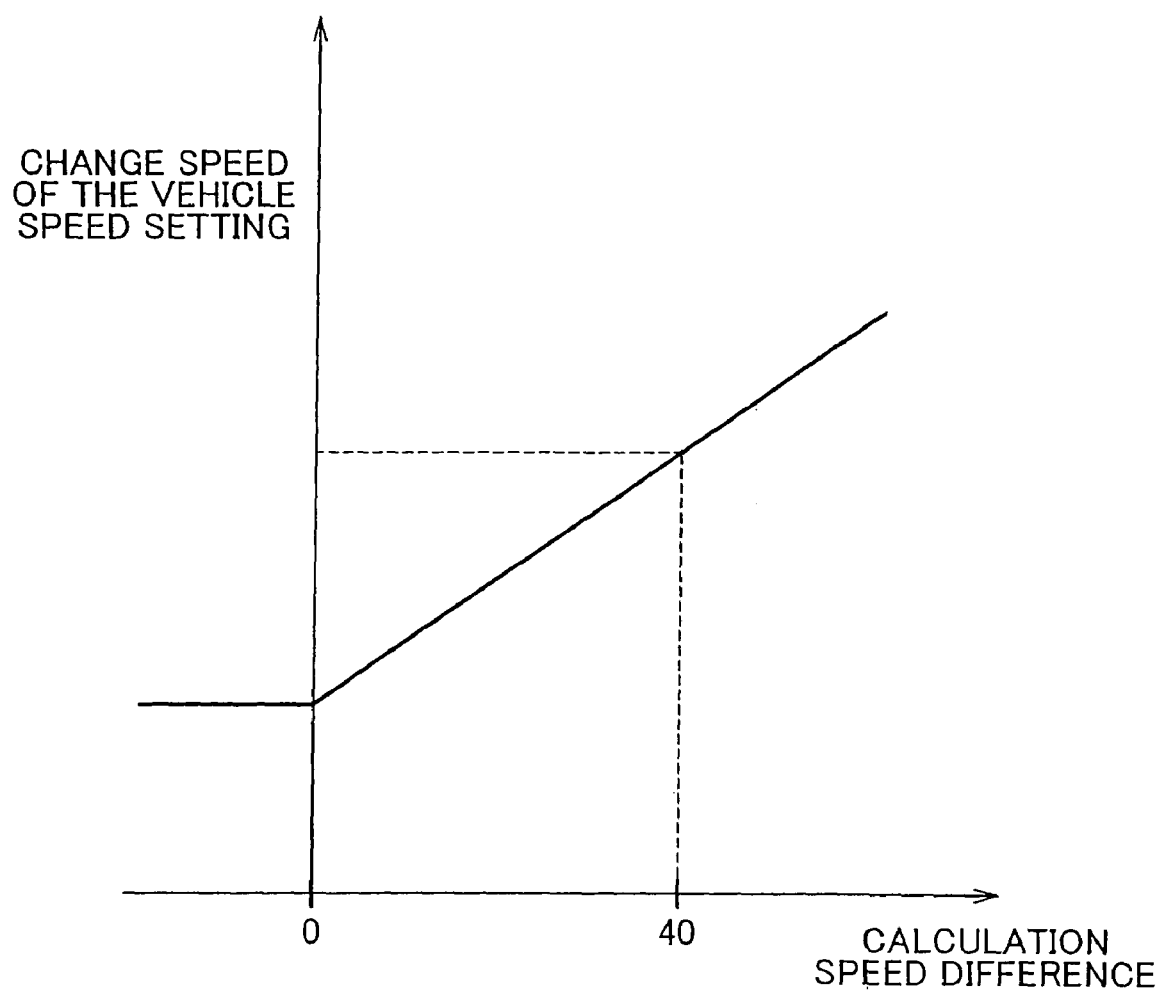
FIG. 8 is a graph showing a specific example of the method for changing the vehicle speed setting.

In step S1603, the change time setting portion 36 first calculates the difference between the detected vehicle speed and the threshold value 1, and then sets a change speed corresponding to that difference based on the relationship between a predetermined speed difference and the change speed. Then the process proceeds on to step S1605. More specifically, the change speed of the vehicle speed setting is gradually increased as the speed difference (i.e., the vehicle speed) increases, similar to the case shown in FIG. 8. On the other hand, in step S1604, the change time setting portion 36 maintains (i.e., does not change) the change speed, after which the process proceeds on to step S1605.

In step S1605 the change instructing portion 38 outputs a command to change the vehicle speed setting at the change speed that was set in the change time setting portion 36. Accordingly, the driver is able to set the vehicle speed setting as desired without feeling odd while looking at the indicator 20. Then the throttle control apparatus 22 and the brake control apparatus 24 control the throttle opening amount and the brake pressure so that the speed of the vehicle comes to match the vehicle speed setting.

As described above in detail, in this example embodiment, the change speed of the vehicle speed setting can be changed according to the running environment of the vehicle, i.e., whether or not there is a leading vehicle according to the ACC system, and the vehicle speed setting can be changed at that set change speed. That is, in Europe (e.g., Germany), for example, there are sections of road with no legal speed limit, such as the Autobahn, interspersed with sections of road where the legal speed limit is approximately 100 km/h. Hence, there are situations where a driver may want to change the vehicle speed setting quickly. For example, the driver may wish to increase the vehicle speed setting from 100 km/h to 180 km/h, for example, all at once, or conversely, decrease the vehicle speed setting from 180 km/h to 100 km/h all at once. In this case, by setting the threshold value 1 at 100 km/h and then increasing the change speed according to the speed (i.e., speed difference) beyond that (i.e., beyond 100 km/h), the vehicle speed setting can be quickly increased according to the vehicle speed when the legal speed limit changes from 100 km/h to 180 km/h and the vehicle speed exceeds 100 km/h. On the other hand, when the legal speed limit changes from 180 km/h to 100 km/h, the vehicle speed will be decreased so that it is below 100 km/h. In this case, however, the vehicle speed setting can be made to decrease rapidly at first and then decrease gradually as the vehicle speed decreases. In this way, it is possible to make the vehicle speed setting appropriate for the running environment as well as meet the expectations of the driver.

Next, a sixth example embodiment of the invention will be described. Next, a sixth example embodiment of the invention will be described. Incidentally, elements that are the same as those elements in the foregoing first example embodiment will be denoted by the same reference numerals and redundant descriptions will be omitted.

Figure 17:
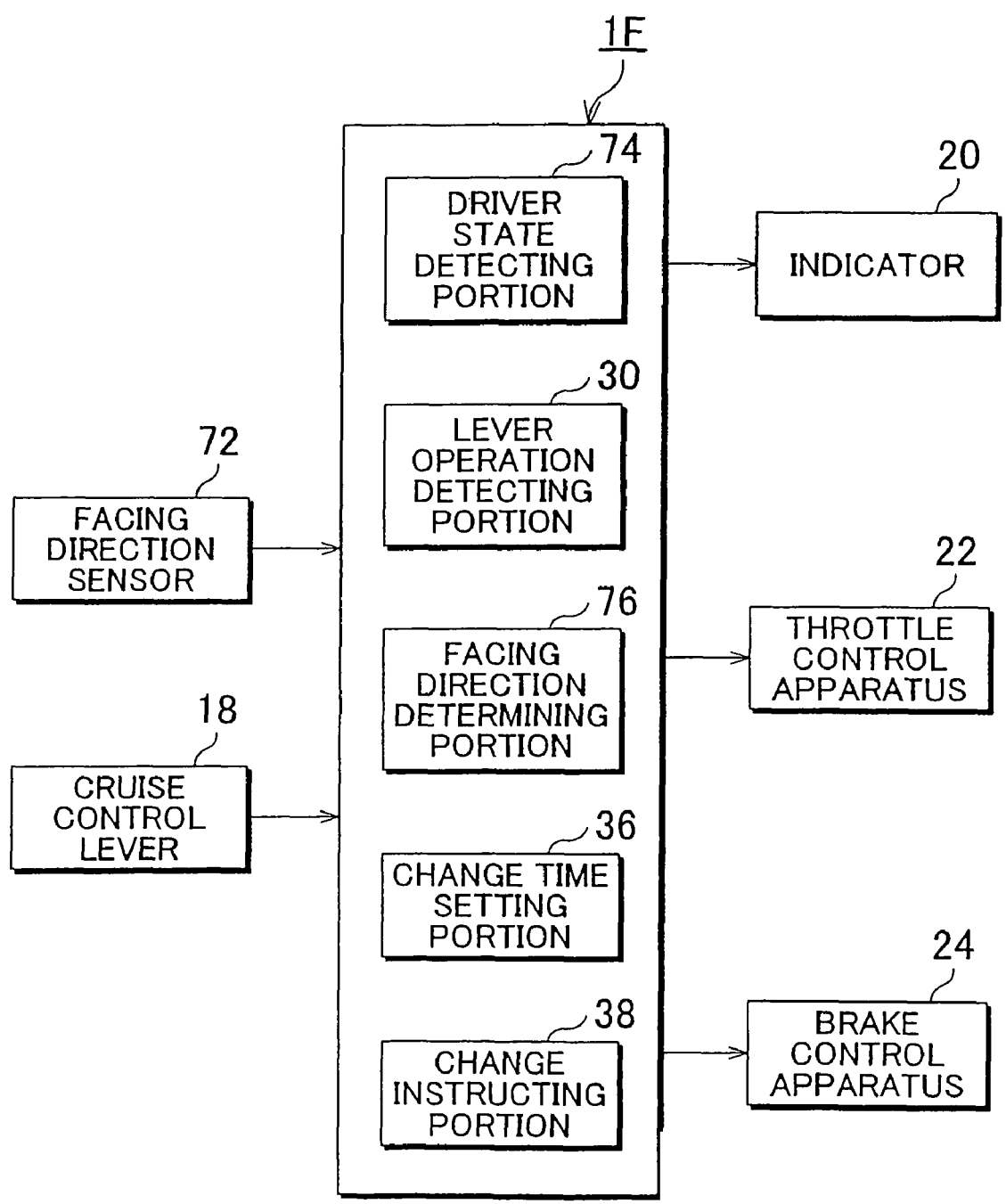
FIG. 17 is a block diagram of an apparatus for changing the vehicle speed setting according to a sixth example embodiment of the invention.

FIG. 17 is a block diagram of an apparatus for changing the vehicle speed setting according to the sixth example embodiment of the invention. As shown in the drawing, the input side of this apparatus 1F is connected to facing direction sensor 72 and a cruise control lever 18.

The facing direction sensor 72 is used to detect the state of the driver in terms of where the driver is facing, i.e., whether the driver is facing forward or is looking off away from the road. The cruise control lever 18 is used to change the vehicle speed setting of cruise control according to an upward or downward operation by the driver.

Also, the output side of this apparatus 1F is connected to an indicator 20, a throttle control apparatus 22, and a brake control apparatus 24, similar to the foregoing first example embodiment.

As shown in FIG. 17, the apparatus 1F is provided with a driver state detecting portion 74, a lever operation detecting portion 30, a facing direction detecting portion 76, a change time setting portion 36, and a change instructing portion 38.

The driver state detecting portion 74 detects the direction that the driver is facing based on information from the facing direction sensor 72. The lever operation detecting portion 30 detects whether the driver is operating the cruise control lever 18. The facing direction determining portion 76 determines whether the driver is facing forward or is looking off based on information from the driver state detecting portion 74. The change time setting portion 36 changes the change speed of the vehicle speed setting according to the state of the driver, or more specifically, where the driver is facing. The method for changing the change speed of the vehicle speed setting will be described in detail later.

The change instructing portion 38 outputs a command to change the vehicle speed setting at the change speed that was set by the change time setting portion 36 in response to an operation of the cruise control lever 18 by the driver. A signal indicative of the vehicle speed setting of cruise control that was set in this manner is output to the throttle control apparatus 22 and the brake control apparatus 24, and the speed of the vehicle is controlled accordingly.

Figure 18:
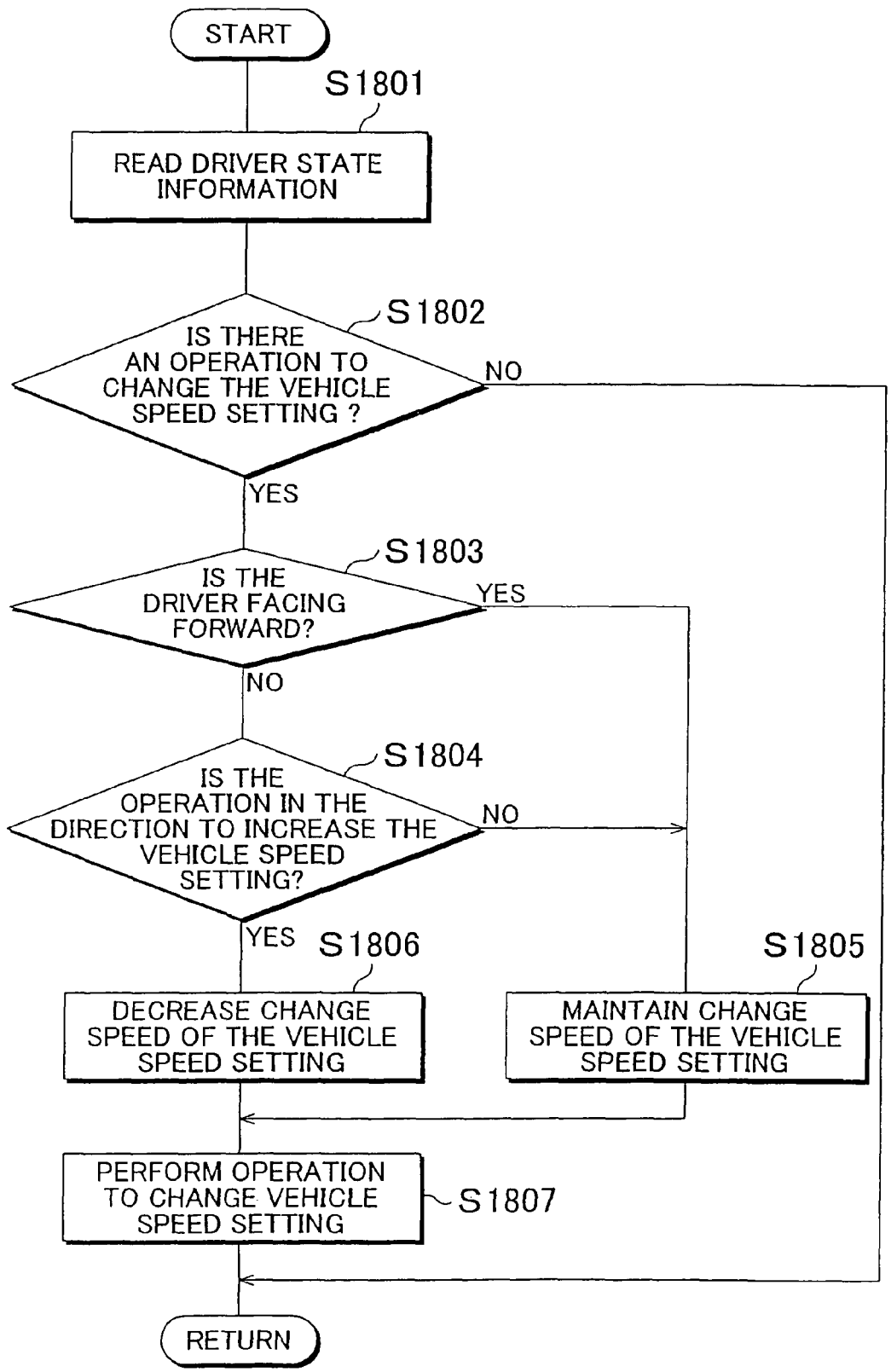
FIG. 18 is a flowchart illustrating a method for changing the vehicle speed setting in the sixth example embodiment.

Next, the method for changing the vehicle speed setting according to the apparatus 1F for changing the vehicle speed setting described above will be described with reference to the flowchart shown in FIG. 18.

First, in step S1801, the driver state detecting portion 74 detects where the driver is facing based on information from the facing direction sensor 72. Next in step S1802, the lever operation detecting portion 30 detects whether there is an operation to change the vehicle speed setting by detecting whether the driver is operating the cruise control lever 18. If the cruise control lever 18 is being operated, the process proceeds on to step S1803. If, on the other hand, the cruise control lever 18 is not being operated, this cycle of the routine ends.

In step S1803, the facing direction determining portion 76 determines whether the driver is facing forward or is looking off based on the information from the driver state detecting portion 74. If the driver is looking off or the like and thus not facing forward, the process proceeds on to step S1804. If, on the other hand, the driver is facing forward, the process proceeds on to step S1805.

In step S1804, the lever operation detecting portion 30 detects whether the cruise control lever 18 is being operated in a direction that increases the vehicle speed setting. If so, the process proceeds on to step S1806. If not, i.e., if the cruise control lever 18 is being operated in a direction that decreases the vehicle speed setting, the process proceeds on to step S1805.

Figure 19:
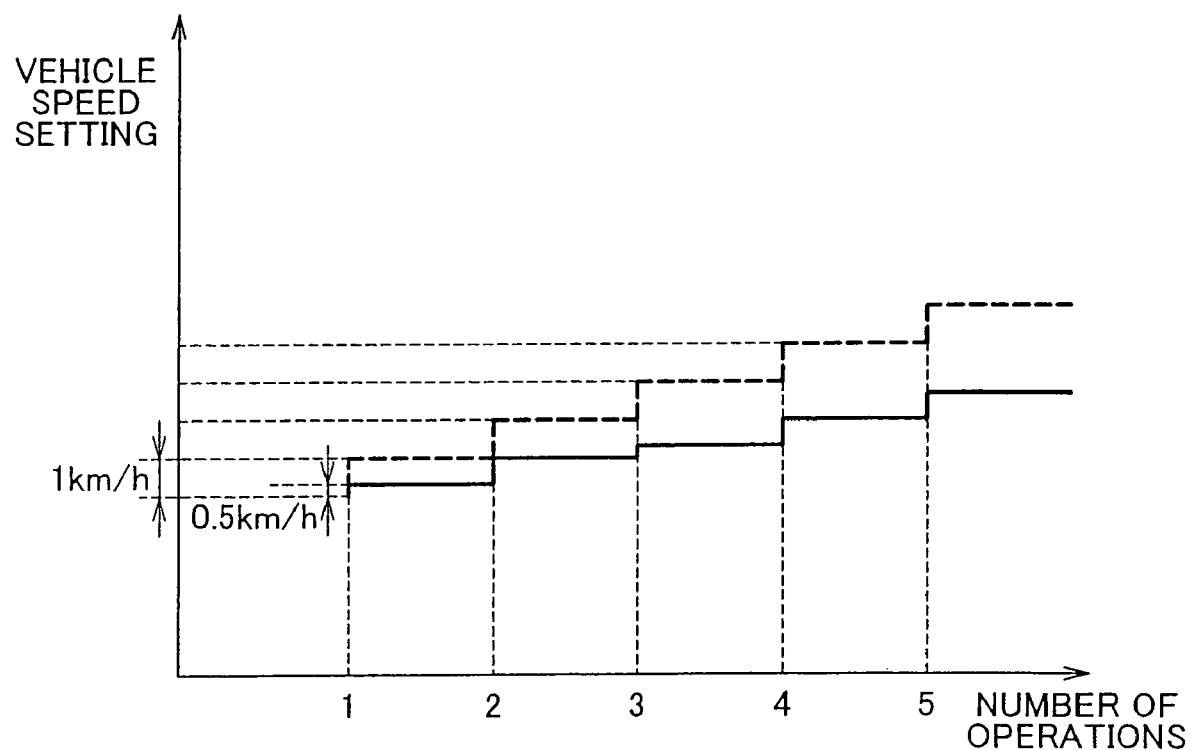
FIG. 19 is a graph showing a specific example of the method for changing the vehicle speed setting during a short operation of the cruise control lever.

In step S1806, the change time setting portion 36 sets the change speed so that it is slower. More specifically, as shown in FIG. 19, the change time setting portion 36 changes the amount of change in (i.e., the step width of) the vehicle speed setting in response to one short operation of the cruise control lever 18 from increments or decrements of 1 km/h (as shown by the broken line) to increments or decrements of 0.5 km/h (as shown by the solid line), for example. Also, as shown in FIG. 20, the change time setting portion 36 changes the amount of change in (i.e., the step width of) the vehicle speed setting when the cruise control lever 18 is operated once but held up or down for an extended period of time from increments or decrements of 5 km/h (as shown by the broken line) to increments or decrements of 2.5 km/h which is half that (as shown by the solid line), and changes the time interval ΔT of that change to 1.5×ΔT, i.e., increases the time interval ΔT of that change by 50%, for example. In this way, a change in the change speed of the vehicle speed setting refers to either a change in the amount of change in (i.e., the step width of) the vehicle speed setting, or a change in the time interval of the change, or both, just as in the foregoing first example embodiment. The process then proceeds on to step S1807. On the other hand, in step S1805, the change time setting portion 36 maintains (i.e., does not change) the change speed, after which the process proceeds on to step S1807.

In step S1807, the change instructing portion 38 outputs a command to change the vehicle speed setting at the change speed that was set in the change time setting portion 36.

Accordingly, the driver is able to set the vehicle speed setting as desired without feeling odd while looking at the indicator 20. Then the throttle control apparatus 22 and the brake control apparatus 24 control the throttle opening amount and the brake pressure so that the speed of the vehicle comes to match the vehicle speed setting.

As described above in detail, in this example embodiment, the change speed of the vehicle speed setting can be changed according to the running environment of the vehicle, i.e., the driver state, and more specifically, according to where the driver is facing, and the vehicle speed setting can be changed at that set change speed. That is, if the driver operates the cruise control lever 18 to increase the vehicle speed setting while he or she is not facing forward, there is a possibility that the vehicle may accelerate to the set vehicle speed setting even if there is a vehicle ahead (i.e., a leading vehicle) which is unable to be detected. To prevent this, in this example embodiment, the change speed of the vehicle speed setting is decreased when the driver is not facing forward so the vehicle speed setting can be increased gradually. This increases safety and enables a vehicle speed setting that is appropriate for the running environment.

While example embodiments of the invention have been illustrated above, it is to be understood that the invention is not limited to the details of the illustrated embodiments, but may be embodied with various changes, modifications or improvements without departing from the spirit and scope of the invention.

For example, the method for changing the change speed of the vehicle speed setting is not limited to the method described in the foregoing example embodiments. More specifically, for example, in the first example embodiment, the amount of change in the vehicle speed setting in response to one short operation of the cruise control lever 18 is changed from increments or decrements of 1 km/h to increments or decrements of 5 km/h, and the amount of change in the vehicle speed setting when the cruise control lever 18 is operated once and held in that position (i.e., either up or down) is changed from increments or decrements of 5 km/h to increments or decrements of 10 km/h which is twice that, and the time interval ΔT of that change is cut in half, i.e., is changed to half ΔT/2. However, the step widths and the time intervals of the change can be set as appropriate.

Further, in the sixth example embodiment, the change speed of the vehicle speed setting is decreased when the driver is not facing forward. Alternatively, however, the structure may be such that the vehicle speed setting does not change even if the cruise control lever 18 is operated when the driver is not facing forward.

The inventon claimed is:

1. An apparatus of a cruise control system provided in a vehicle, which changes a vehicle speed setting of cruise control based on an operation by a driver, comprising:
   a change time setting portion that changes a change speed of the vehicle speed setting according to a running environment of the vehicle; and
   a change instructing portion that outputs a command to change the vehicle speed setting at the change speed that was set by the change time setting portion, wherein the running environment is the type of road on which the vehicle is traveling.

2. The apparatus according to claim 1, wherein the road type includes an ordinary road and an expressway.

3. The apparatus according to claim 1, wherein the road type includes a traveling lane and a passing lane.

4. The apparatus according to claim 1, wherein the road type includes a straight road and a curved road.

5. A cruise control system comprising:
   the apparatus according to claim 1;
   an image sensor for obtaining an image of an area around the vehicle;
   a navigation system; and
   a cruise control lever that is operated by the driver to change the vehicle speed setting,
   wherein the apparatus further includes a lane detecting portion that determines the which lane the vehicle is traveling in based on information obtained from the image sensor and the navigation system; and a lever operation detecting portion that detects an operation of the cruise control lever as well as the direction of that operation; and the change time setting portion increases the change speed when it has been determined that the vehicle is traveling in a passing lane of an expressway and the direction of the operation of the cruise control lever is a direction that increases the vehicle speed setting.

6. The apparatus according to claim 1, further including a sensor that senses the running environment of the vehicle, and wherein the change time setting portion changes the change speed of the vehicle speed setting responsive to the sensed running environment.

7. A cruise control system comprising:
   the apparatus according to claim 4;
   an image sensor for obtaining an image of an area around the vehicle;
   a yaw rate sensor;
   a steering angle sensor;
   a navigation system; and
   a cruise control lever that is operated by the driver to change the vehicle speed setting,
   wherein the apparatus further includes an optimum speed calculating portion which detects whether a road on which the vehicle is traveling is a curved road from information obtained from the image sensor and the navigation system, calculates a curvature of the road on which the vehicle is currently traveling and the curvature along a route that the vehicle is expected to travel based on information from the yaw rate sensor and the steering angle sensor in addition to the image sensor and the navigation system, and calculates a first optimum speed for the curvature of the road on which the vehicle is currently traveling and a second optimum speed for the curvature along the route that the vehicle is expected to travel;
   a speed difference setting portion that calculates a first speed difference, which is a difference between the current vehicle speed setting and the first optimum speed, and a second speed difference, which is a difference between the current vehicle speed setting and the second optimum speed; and
   a lever operation detecting portion that detects an operation of the cruise control lever as well as the direction of that operation; and
   wherein the change time setting portion increases the change speed according to the greater difference, from among the first speed difference and the second speed difference, when at least one of the first speed difference and the second speed difference is a positive value and the direction of the operation of the cruise control lever is a direction that increases the vehicle speed setting.

8. The cruise control system according to claim 5, further comprising:
a turn indicator,
wherein the apparatus further includes a blinker detecting portion that detects the direction indicated by the turn indicator; and
wherein the change time setting portion increases the change speed when it has been determined that the vehicle is traveling in a traveling lane of an expressway, the direction indicated is to a passing lane side, and the direction of the operation of the cruise control lever is the direction that increases the vehicle speed setting.

9. The apparatus according to claim 6, wherein the change time setting portion changes the change speed of the vehicle speed setting responsive to (a) the sensed running environment and (b) the operation by the driver.

10. An apparatus of a cruise control system provided in a vehicle, which changes a vehicle speed setting of cruise control based on an operation by a driver, comprising:
a change time setting portion that changes a change speed of the vehicle speed setting according to a running environment of the vehicle; and
a change instructing portion that outputs a command to change the vehicle speed setting at the change speed that was set by the change time setting portion, wherein the cruise control system is an adaptive cruise control system, and the running environment is the presence or absence of a leading vehicle according to the adaptive cruise control system.

11. A cruise control system comprising:
the apparatus according to claim 10;
an image sensor for obtaining an image of an area around the vehicle;
a millimeter wave sensor that detects an object by sending out millimeter waves; and
a cruise control lever that is operated by the driver to change the vehicle speed setting,
wherein the apparatus further includes a leading vehicle determining portion that determines whether there is a leading vehicle based on information obtained from the millimeter wave sensor and the image sensor, and a lever operation detecting portion that detects an operation of the cruise control lever as well as the direction of that operation; and
wherein the change time setting portion increases the change speed when it is determined that there is a leading vehicle and the direction of the operation of the cruise control lever is a direction that increases the vehicle speed setting.

12. The apparatus according to claim 10, further including a sensor that senses the running environment of the vehicle, and wherein the change time setting portion changes the change speed of the vehicle speed setting responsive to the sensed running environment.

13. The apparatus according to claim 12, wherein the change time setting portion changes the change speed of the vehicle speed setting responsive to (a) the sensed running environment and (b) the operation by the driver.

14. An apparatus of a cruise control system provided in a vehicle, which changes a vehicle speed setting of cruise control based on an operation by a driver, comprising:
a change time setting portion that changes a change speed of the vehicle speed setting according to a running environment of the vehicle; and
a change instructing portion that outputs a command to change the vehicle speed setting at the change speed that was set by the change time setting portion, wherein the running environment is a speed of the vehicle.

15. A cruise control system comprising:
the apparatus according to claim 14;
a vehicle speed sensor that detects a vehicle speed; and
a cruise control lever that is operated by the driver to change the vehicle speed setting,
wherein the apparatus further includes a vehicle speed detecting portion that detects the vehicle speed based on information obtained from the vehicle speed sensor, and a comparing portion that compares the vehicle speed with a predetermined value; and
wherein the change time setting portion calculates a difference between the vehicle speed and the predetermined value when the vehicle speed is greater than the predetermined value, and increases the change speed as the difference increases.

16. The apparatus according to claim 14, further including a sensor that senses the running environment of the vehicle, and wherein the change time setting portion changes the change speed of the vehicle speed setting responsive to the sensed running environment.

17. The apparatus according to claim 16, wherein the change time setting portion changes the change speed of the vehicle speed setting responsive to (a) the sensed running environment and (b) the operation by the driver.

18. An apparatus of a cruise control system provided in a vehicle, which changes a vehicle speed setting of cruise control based on an operation by a driver, comprising:
a change time setting portion that changes a change speed of the vehicle speed setting according to a running environment of the vehicle; and
a change instructing portion that outputs a command to change the vehicle speed setting at the change speed that was set by the change time setting portion, wherein the running environment is a state of a driver.

19. A cruise control system comprising:
the apparatus according to claim 18;
a facing direction sensor that detects where the driver is facing; and
a cruise control lever that is operated by the driver to change the vehicle speed setting,
wherein the apparatus further includes a driver state detecting portion that detects the direction that the driver is facing based on information from the facing direction sensor, and a facing direction determining portion that determines whether the driver is facing forward based on information from the driver state detecting portion; and
wherein the change time setting portion decreases the change speed when the driver is not facing forward and the direction of the operation of the cruise control lever is a direction that increases the vehicle speed setting.

20. The apparatus according to claim 18, further including a sensor that senses the running environment of the vehicle, and wherein the change time setting portion changes the change speed of the vehicle speed setting responsive to the sensed running environment.

21. The apparatus according to claim 20, wherein the change time setting portion changes the change speed of the vehicle speed setting responsive to (a) the sensed running environment and (b) the operation by the driver.

* * * * *